(12) United States Patent
Petrenko

(10) Patent No.: US 7,703,300 B2
(45) Date of Patent: Apr. 27, 2010

(54) PULSE SYSTEMS AND METHODS FOR DETACHING ICE

(75) Inventor: Victor Petrenko, Lebanon, NH (US)

(73) Assignee: The Trustees of Dartmouth College, Hanover, NH (US)

(*) Notice: Subject to any disclaimer, the term of this patent is extended or adjusted under 35 U.S.C. 154(b) by 126 days.

(21) Appl. No.: 11/571,231

(22) PCT Filed: Jun. 22, 2005

(86) PCT No.: PCT/US2005/022035
§ 371 (c)(1),
(2), (4) Date: Apr. 23, 2009

(87) PCT Pub. No.: WO2006/002224
PCT Pub. Date: Jan. 5, 2006

(65) Prior Publication Data
US 2009/0199569 A1 Aug. 13, 2009

Related U.S. Application Data

(60) Provisional application No. 60/581,912, filed on Jun. 22, 2004, provisional application No. 60/646,394, filed on Jan. 24, 2005, provisional application No. 60/646,932, filed on Jan. 25, 2005.

(51) Int. Cl.
*F25C 5/08* (2006.01)

(52) U.S. Cl. .......................................... 62/351; 219/543

(58) Field of Classification Search .................. 62/73, 62/351; 218/538, 543, 548
See application file for complete search history.

(56) References Cited

U.S. PATENT DOCUMENTS 1,157,344 A 10/1915 Thomson
1,656,329 A 1/1928 Sievert et al.

(Continued)

FOREIGN PATENT DOCUMENTS

BE 410547 7/1935

(Continued)

OTHER PUBLICATIONS

U.S. Appl. No. 11/338,239, Office Action mailed Nov. 26, 2008, 10 pages.

(Continued)

*Primary Examiner*—William E Tapolcai
(74) *Attorney, Agent, or Firm*—Lathrop & Gage LLP

(57) ABSTRACT

A pulse system for detaching ice includes a power supply for applying a high-power heating pulse to the interface between ice and an object such as a cold plate of an ice making system, an ice-container, a heat-exchanger, a refrigerator surface or an airplane wing. Pulse heating may be generated within a metal foil or resistive film disposed upon an object to be deiced, or a capillary tube proximate the object to be deiced. An interfacial layer of ice is melted and the ice is released from the object. A force, for example gravity, pressure of vaporization or mechanical scraping, removes the ice from the object.

28 Claims, 25 Drawing Sheets

U.S. PATENT DOCUMENTS

| | | | |
|---|---|---|---|
| 2,024,612 A | 11/1933 | Sulzberger | |
| 2,205,543 A | 11/1937 | Rideau et al. | |
| 2,496,279 A | 2/1950 | Ely et al. | |
| 2,870,311 A | 1/1959 | Greenfield et al | |
| 2,988,899 A | 6/1961 | Heron | |
| 3,204,084 A | 8/1965 | Spencer, Jr. et al. | |
| 3,256,920 A | 6/1966 | Byers | |
| 3,316,344 A | 4/1967 | Kidd et al. | |
| 3,316,345 A | 4/1967 | Toms et al. | |
| 3,380,261 A | 4/1968 | Hendrix et al. | |
| 2,522,199 A | 10/1969 | Shreve | |
| 3,790,752 A | 2/1974 | Boaz et al | |
| 3,809,341 A | 5/1974 | Levin et al. | |
| 3,825,371 A | 7/1974 | Roder et al. | |
| 3,835,269 A | 9/1974 | Levin et al. | |
| 3,915,883 A | 10/1975 | VanMeter et al. | |
| 3,964,183 A | 6/1976 | Muoat | |
| 3,971,056 A | 7/1976 | Jaskolski et al. | |
| 4,081,914 A | 4/1978 | Rautenbach | |
| 4,082,962 A | 4/1978 | Burgsdorf et al. | |
| 4,085,338 A | 4/1978 | Genrikh et al. | |
| 4,119,866 A | 10/1978 | Genrikh et al. | |
| 4,135,221 A | 1/1979 | Genrikh et al. | |
| 4,137,447 A | 1/1979 | Boaz | |
| 4,190,137 A | 2/1980 | Shimada et al. | |
| 4,278,875 A | 7/1981 | Bain | |
| 4,321,296 A | 3/1982 | Rougier | |
| 4,330,703 A | 5/1982 | Horsma et al. | |
| 4,442,681 A | 4/1984 | Fischer et al. | |
| 4,531,380 A | 7/1985 | Hagen | |
| 4,571,860 A | 2/1986 | Long | |
| 4,638,960 A | 1/1987 | Straube et al. | |
| 4,690,353 A | 9/1987 | Haslim et al. | |
| 4,732,351 A | 3/1988 | Bird | |
| 4,737,618 A | 4/1988 | Barbier et al. | |
| 4,760,978 A | 8/1988 | Schuyler et al. | |
| 4,773,976 A | 9/1988 | Vexler | |
| 4,798,058 A | 1/1989 | Gregory | |
| 4,814,546 A | 3/1989 | Whitney et al. | |
| 4,820,902 A | 4/1989 | Gillery | |
| 4,862,055 A | 8/1989 | Maruyama | |
| 4,875,644 A | 10/1989 | Adams et al. | |
| 4,887,041 A | 12/1989 | Mashikian | |
| 4,897,597 A | 1/1990 | Whitener | |
| 4,950,950 A | 8/1990 | Perry et al. | |
| 4,985,313 A | 1/1991 | Penneck et al. | |
| 5,057,763 A | 10/1991 | Torii et al. | |
| 5,109,140 A | 4/1992 | Nguyen | |
| 5,112,449 A | 5/1992 | Jozefowicz et al. | |
| 5,143,325 A | 9/1992 | Zieve et al. | |
| 5,144,962 A | 9/1992 | Counts et al. | |
| 5,218,472 A | 6/1993 | Jozefowicz et al. | |
| 5,344,696 A | 9/1994 | Hastings et al. | |
| 5,398,547 A | 3/1995 | Gerardi et al. | |
| 5,408,844 A * | 4/1995 | Stokes | 62/351 |
| 5,411,121 A | 5/1995 | LaForte et al. | |
| 5,441,305 A | 8/1995 | Tabar | |
| 5,496,989 A | 3/1996 | Bradford et al. | |
| 5,523,959 A | 6/1996 | Seegmiller | |
| 5,551,288 A | 9/1996 | Geraldi et al. | |
| 5,582,754 A * | 12/1996 | Smith et al. | 219/438 |
| 5,605,418 A | 2/1997 | Watanabe et al. | |
| 5,744,704 A | 4/1998 | Hu et al. | |
| 5,861,855 A | 1/1999 | Arsenault et al. | |
| 5,873,254 A | 2/1999 | Arav | |
| 5,886,321 A | 3/1999 | Pinchok et al. | |
| 5,902,962 A | 5/1999 | Gazdzinski | |
| 5,934,617 A | 8/1999 | Rutherford et al. | |
| 5,947,418 A | 9/1999 | Bessiere et al. | |
| 6,018,152 A | 1/2000 | Allaire et al. | |
| 6,027,075 A | 2/2000 | Petrenko | |
| 6,031,214 A | 2/2000 | Bost et al. | |
| 6,129,314 A | 10/2000 | Giamati et al. | |
| 6,133,555 A | 10/2000 | Brenn | |
| 6,145,787 A | 11/2000 | Rolls | |
| 6,193,793 B1 | 2/2001 | Long et al. | |
| 6,194,685 B1 | 2/2001 | Rutherford | |
| 6,227,492 B1 | 5/2001 | Schellhase et al. | |
| 6,237,874 B1 | 5/2001 | Rutherford et al. | |
| 6,239,601 B1 | 5/2001 | Weinstein | |
| 6,246,831 B1 | 6/2001 | Seitz et al. | |
| 6,270,118 B1 | 8/2001 | Ichikawa | |
| 6,279,856 B1 | 8/2001 | Rutherford et al. | |
| 6,294,765 B1 | 9/2001 | Brenn | |
| 6,297,165 B1 | 10/2001 | Okumura et al. | |
| 6,297,474 B1 | 10/2001 | Kelly et al. | |
| 6,330,986 B1 | 12/2001 | Rutherford et al. | |
| 6,396,172 B1 | 5/2002 | Couture | |
| 6,427,946 B1 | 8/2002 | Petrenko | |
| 6,492,629 B1 | 12/2002 | Sopory | |
| 6,558,947 B1 | 5/2003 | Lund et al. | |
| 6,653,598 B2 | 11/2003 | Petrenko et al. | |
| 6,693,786 B2 | 2/2004 | Petrenko | |
| 6,723,971 B1 | 4/2004 | Petrenko et al. | |
| 6,825,444 B1 | 11/2004 | Tuan et al. | |
| 6,870,139 B2 | 3/2005 | Petrenko | |
| 7,444,829 B2 * | 11/2008 | Mori et al. | 62/351 |
| 2001/0052731 A1 | 12/2001 | Petrenko | |
| 2002/0017466 A1 | 2/2002 | Petrenko | |
| 2002/0092849 A1 | 7/2002 | Petrenko | |
| 2002/0096515 A1 | 7/2002 | Petrenko | |
| 2002/0118550 A1 | 8/2002 | Petrenko et al. | |
| 2002/0170909 A1 | 11/2002 | Petrenko | |
| 2002/0175152 A1 | 11/2002 | Petrenko | |
| 2003/0024726 A1 | 2/2003 | Petrenko | |
| 2003/0046942 A1 | 3/2003 | Shedivy et al. | |
| 2003/0155467 A1 | 8/2003 | Petrenko | |
| 2003/0155468 A1 | 8/2003 | Lammer | |
| 2004/0149734 A1 * | 8/2004 | Petrenko et al. | 219/538 |
| 2006/0086715 A1 | 4/2006 | Briggs | |
| 2007/0045282 A1 | 3/2007 | Petrenko | |

FOREIGN PATENT DOCUMENTS

| | | |
|---|---|---|
| BE | 528926 | 6/1954 |
| DE | 1476989 | 10/1969 |
| DE | 2510660 A1 | 9/1976 |
| DE | 2510755 | 9/1976 |
| DE | 3626613 | 2/1988 |
| DE | 3921900 C1 | 7/1990 |
| DE | 4440634 | 7/1996 |
| EP | 1168888 | 1/2002 |
| FR | 2570333 | 3/1986 |
| GB | 528926 | 6/1954 |
| GB | 820908 | 9/1959 |
| GB | 917055 A | 1/1963 |
| GB | 2 106 966 A | 4/1981 |
| GB | 2 252 285 A | 5/1992 |
| GB | 2 259 287 A | 3/1993 |
| GB | 2261333 | 5/1993 |
| GB | 2319943 A | 6/1998 |
| JP | 405292638 A | 11/1993 |
| JP | 407023520 A | 1/1995 |
| JP | 2005180823 | 7/2005 |
| JP | 2005180824 | 7/2005 |
| RU | 2289892 | 1/2006 |
| SU | 983433 | 12/1982 |
| WO | WO 00/24634 | 5/2000 |
| WO | WO 00/33614 | 6/2000 |
| WO | WO 00/52966 | 9/2000 |
| WO | WO 01/08973 A1 | 2/2001 |
| WO | WO 01/49564 | 7/2001 |
| WO | WO 03/062056 | 7/2003 |
| WO | WO 03/069955 | 8/2003 |

| WO | WO 2005/061974 A | 7/2005 |
| WO | WO 2006/002224 | 1/2006 |
| WO | WO 2006/081180 | 3/2006 |

OTHER PUBLICATIONS

U.S. Appl. No. 11/338,239, Response to Office Action filed Mar. 24, 2009, 24 pages.
U.S. Appl. No. 11/338,239 Notice of Allowance and Examiner Interview Summary mailed Aug. 18, 2009, 7 pages.
U.S. Appl. No. 11/409,914, Response to Office Action filed Sep. 23, 2008, 9 pages.
U.S. Appl. No. 11/409,914, Advisory Action mailed Oct. 20, 2008, 3 pages.
U.S. Appl. No. 11/409,914, Response and Request for Continued Examination filed Oct. 23, 2008; 12, pages.
U.S. Appl. No. 11/409,914, Office Action mailed Jan. 26, 2009, 6 pages.
U.S. Appl. No. 11/409,914, Response to Office Action filed Apr. 14, 2009, 5 pages.
U.S. Appl. No. 11/409,914, Notice of Allowance mailed Jul. 24, 2009, 5 pages.
Canadian Application 2,570,986 Office Action dated Dec. 29, 2008, 3 pages.
Canadian Application 2,570,986 Response to Office Action dated Jun. 23, 2009, 13 pages.
Canadian Application 2,476,202 Notice of Allowance dated Dec. 5, 2008, 1 page.
Chinese Application No. 03808185.7 English Translation of Office Action dated May 9, 2008.
Chinese Application No. 200680003031.6 Office Action with English Translation, Oct. 17, 2008; 23 pages.
European Application 05761644.3; Reply to Communication Pursuant to Article 94(3) EPC; Filed Jan. 28, 2009, 72 pages.
Japanese Application 2003-568934; Response filed Jul. 18, 2008; 22 pages.
Korean Application No. 10-2007-7001352 Notice of Final Decision for Patent Registration, Apr. 22, 2009, 3 pages.
PCT/US08/55928, International Preliminary Report on Patentability mailed Jun. 5, 2009; 11 pages.
PCT/US08/55928, International Search Report & Written Opinion mailed Jan. 13, 2009, 16 pages.
PCT/US08/55928, Response to Written Opinion, filed Apr. 13, 2009.
PCT/US2008/081902, Invitation to Pay Additional Fees, mailed Apr. 3, 2009, 10 pages.
PCT/US2008/081902,International Search Report & Written Opinion, mailed Jun. 9, 2009, 22 pages.
"The Evolution of Ice Protection Creates a Revolution in Ice Detection," BF Goodrich AErospace Ice Protection Systems, 2 pages.
Petrenko, V.F. & Peng, S., "Reduction of Ice Adhesion to Metal by Using Self-Assembling Monolayers (SAMs)", Canadian Journal of Physics, Jan./Feb. 2003, pp. 387-393, vol. 81, No. ½.
Petrenko, Victor F., "Electromechanical Phenomena in Ice," Thayer School of Engineering Special Report 96-2; Feb. 1996.
Petrenko, Victor F., and Whitworth, Robert W., "Physics of Ice," copyright 1999, pp. 1-373, Oxford University Press, Oxford, New York.
Petrenko, Victor F.; "Study of the Surface of Ice, Ice/Solid and Ice/Liquid Interfaces with Scanning Force Microscopy;" American Chemical Society Jun. 2, 1997.
Petrenko, Victor F., "The effect of static electric fields on ice friction", Journal of Applied Physics, Jul. 15, 1994, pp. 1216-1219, vol. 76, No. 2.
Petrenko, Victor F. and Colebeck, Samuel C., "Generation of electric fields by ice and snow friction", Journal of Applied Physics, May 1, 1995, pp. 4518-4521, vol. 77, No. 9.
Petrenko, V.F. and Schulson, E.M., "Action of Electric Fields on the Plastic Deformation of Pure and Doped Ice Single Crystals", Philosophical Magazine A, 1993, pp. 173-185, vol. 67, No. 1.
Reich, A., AIA 94-0714, "Interface Influences Upon Ice Adhesion to Airfoil Materials", BFGoodrich Aerospace/De-icing Systems, Brecksville/Uniontown, OH (32nd Aerospace Sciences Meeting and Exhibit, Jan. 10-13, 1994), pp. 1-8.

"Icing Wind Tunnel", Meeting the Challenges of Ice Testing in a World-Class Facility—BFGoodrich Aerospace Ice Protection Systems, 4 pages.
"Everstart Automotive", http://www.everstart-batteries.com/products/use/automotive.asp, May 5, 2003, 1 page.
"Maxwell Technologies: Ultracapacitors-Boostcap PC2500", http://www.maxwell.com/ultracapacitors/products/PC2500.html, May 5, 2003, 2 pages.
Petrenko, V.F. and Schulson, E.M., "The effect of static electric fields on proton conductivity of single ice crystals", Philosophical Magazine B, 1992, pp. 341-353, vol. 66, No. 3.
Petrenko, V.F, et al. "Pulse Electrothermal De-Icing", Proceedings of the International Offshore and Polar Engineering Conference, May 30, 2003; pp. 435-438.
Phillips, Edward H., "New Goodrich Wind Tunnel Tests Advanced Aircraft De-Icing Systems", Uniontown, Ohio, Aviation Week Magazine, Oct. 3, 1988, 3 pages.
Courville, Z. & Petrenko, V.F., "De-icing Layers of Interdigitated Microelectrodes", Mat. Res. Soc. Symp. Proc. 2000, pp. 329-334, vol. 604.
Petrenko, V.F. & Qi, Suogen, "Reduction of Ice Adhesion to Stainless Steel by Ice Electrolysis", Journal of Applied Phy7sics, pp. 5450-5454, Nov. 1999, vol. 86, No. 10.
Incropera, F.P. & DeWitt, D.P.; Fundamentals of Heat and Mass Transfer; 5th Ed.; John Wiley & Sons; 2002; pp. 596-601.
PCT/US98/1242, International Search Report; Nov. 3, 1998; 3 pages.
PCT/US99/28330, International Search Report, Jul. 19, 2000; 2 pages.
PCT/US99/25124, International Search Report, Feb. 29, 2000; 2 pages.
PCT/US00/05665, International Search Report, mailed Aug. 4, 2000; 2 pages.
PCT/US00/35529, International Search Report, mailed Jun. 14, 2001; 2 pages.
PCT/US07/69478, International Search Report and Written Opinion mailed Jul. 21, 2008; 13 pages.
PCT/US05/022035, International Search Report dated Feb. 15, 2006; 5 pages.
PCT/US05/022035 International Preliminary Report on Patentability & Written Opinion dated Feb. 15, 2006; 39 pages.
PCT/US05/022035 Response to Written Opinion dated May 15, 2006; 38 pages.
PCT/US06/002283, Invitation to Pay Additional Fees Jul. 28, 2006; 6 pages.
PCT/US06/002283, International Preliminary Report on Patentability & Written Opinion dated Jul. 24, 2007; 12 pages.
PCT/US06/002283 International Search Report dated Sep. 14, 2006; 5 pages.
PCT/US03/04170, International Preliminary Examination Report dated Dec. 17, 2003; 2 pages.
PCT/US03/04170, Written Opinion mailed Sep. 30, 2003; 2 pages.
PCT/US03/04170, International Search Report, mailed Jul. 1, 2003; 3 pages.
PCT/US00/35529, International Preliminary Examination Report, Jul. 19, 2004; 3 pages.
U.S. Appl. No. 10/364,438, selected pages of Image File Wrapper, Apr. 5, 2004 through Nov. 2, 2004; 44 pages.
U.S. Appl. No. 10/939,289, selected pages of Image File Wrapper, Mar. 28, 2005 trough Feb. 21, 2006; 45 pages.
U.S. Appl. No. 11/338,239, selected pages of Image File Wrapper, Jan. 17, 2007 through Nov. 26, 2008; 114 pages.
U.S. Appl. No. 11/409,914, selected pages of Image File Wrapper, Feb. 12, 2007 through Oct. 23, 2008; 99 pages.
European Application 03709059; Communication Pursuant to Article 96(2) EPC; Jun. 9, 2006; 6 pages.
European Application 03709059; Communication Pursuant to Article 96(2) EPC; Jan. 8, 2007; 5 pages.
European Application 03709059; Communication Pursuant to Article 96(2) EPC; Aug. 14, 2007; 4 pages.
European Application 05761644.3; Communication Pursuant to Rules 109 and 1110 EPC; Feb. 13, 2007; 2 pages.
European Application 05761644.3; Communication Pursuant to Article 94(3) EPC; Sep. 18, 2008; 3 pages.

European Application 06719229.4; Communication Pursuant to Rules 109 and 1110 EPC; Sep. 4, 2007; 2 pages.
European Application 03709059; Decision to Grant European Patent; Jul. 17, 2008; 2 pages.
Russian Patent Application No. 2004127250; Translation of Official Action; Nov. 2005; 4 pages.
Russian Patent Application No. 2004127250; Decision on Grant; Jun. 5, 2006; pp. 1-2.
Canadian Patent Application No. 2,476,202; Restriction Requirement; Feb. 22, 2008; 2 pages.
Canadian Patent Application No. 2,476,202; Response to Restriction Requirement; filed Aug. 22, 2008; 17 pages.
Korean Application No. 10-2004-7012335; Office Action; Apr. 27, 2007 with English language Summary of the Office Action; 5 pages.
Korean Application No. 10-2004-7012335; Certificate of Patent; Patent No. 10-0799779 with English Abstract; Jan. 24, 2008; 3 pages.
Korean Application No. 10-2007-7001352; Office Action; Mar. 31, 2008 with English language Summary of the Office Action; 7 pages.
Korean Application No. 10-2004-7012335; Office Action; Oct. 24, 2006 with English language Summary of the Office Action; 3 pages.
Japanese Patent Application No. 2003-568934; Notice of Reasons for Rejection; Jan. 11, 2008; 7 pages.
Ukrainian Patent Application No. 20040907418; Decision on Grant; Jan. 17, 2007; 14 pages.
PCT/US08/55928, Invitation to Pay Additional Fees & Partial Search Report, mailed Oct. 31, 2008, 4 pages.

* cited by examiner

PULSE SYSTEMS AND METHODS FOR DETACHING ICE

CROSS-REFERENCE TO RELATED APPLICATIONS

This application claims the benefit of priority to commonly-owned U.S. Provisional Patent Application Nos. 60/581,912, filed 22 Jun. 2004; 60/646,394, filed 24 Jan. 2005 and 60/646,932, filed 25 Jan. 2005. All of the foregoing applications and patent are incorporated herein by reference.

BACKGROUND

Detaching ice from surfaces is important in applications such as, for example, deicing of equipment that is stationary or is used outdoors (e.g., aircraft, power lines, roadways, roofs), deicing of equipment that builds up ice in operation (e.g., heat exchangers, freezers), and icemaking equipment.

In conventional residential and commercial ice makers, ice is slowly grown from water cooled by a cold plate or grid. After ice growth is completed, the cold plate/grid is heated slowly above an ice melting point to release the ice; this heating stage Consumes both energy and time, thus reducing ice-maker efficiency and productivity. Moreover, it takes significant heat flow to warm up ice-maker hardware and the grown ice from ice growth temperature to the ice melting point. It then takes even more time and energy to re-cool the ice-maker hardware before new ice begins to grow.

SUMMARY OF THE INVENTION

In one embodiment, an ice making system includes a cold plate, a dielectric film, a thin metal foil cooled by the cold plate through the dielectric film, a power supply, and a switch operable to connect the power supply to the thin metal foil. Water adjacent the metal foil forms ice that is released from the metal foil upon operation of the switch, which allows current from the power supply to pass through the thin metal foil, generating a heating pulse to melt an interfacial layer of the ice.

In one embodiment, an ice making system includes a cold plate, a metal foil cooled by the cold plate, a power supply, and a switch operable to connect the power supply to the metal foil. Water adjacent the metal foil forms ice that is released from the metal foil upon operation of the switch, which generates a heating pulse to melt an interfacial layer of the ice at the metal foil.

In one embodiment, an ice making system has an ice-container, a capillary tube located within the base of the ice-container and a power supply. The ice-container converts water to ice when cooled. The power supply applies pulse heating energy to the ice-container and capillary tube. The pulse heating melts an interfacial layer of ice in the ice-container and evaporates ice in the capillary tube to eject ice from the ice-container.

In one embodiment, an evaporative de-icing system includes a resistive film disposed upon an object to be deiced, an array of capillaries, each having an open end flush with the surface of the object, and a power supply. The power supply supplies energy to the resistive film, to generate pulse heating energy therein, and to the capillaries, to evaporate ice within the capillaries and eject ice from the object.

In one embodiment, an evaporative de-icing system has a resistive film disposed on a surface of an object to be deiced, a strip of porous metal foil and a power supply. The power supply supplies energy to the resistive film and the strip of porous metal. Pulse heating energy is generated within the resistive film such that an interfacial layer of ice adjacent the resistive film is melted. Ice is evaporated within the strip of porous metal, and the ice is ejected from the object.

In one embodiment, a system for de-icing a refrigerator includes a heat exchanger with an accordion type surface, a wall pipe with flowing coolant, and a power supply electrically switched to the heat exchanger for pulse heating the heat exchanger to remove ice from the heat exchanger.

In one embodiment, a system for de-icing a heat exchanger includes a base tube, a plurality of fins attached to the base tube, a power supply and a switch connecting the power supply to the base tube. The switch operates to apply a pulse of electrical current to the base tube. Joule heating raises the temperature of the base tube and the fins, to melt ice attached thereto

DETAILED DESCRIPTION OF THE DRAWINGS

U.S. patent application Ser. No. 10/364,438 describes Pulse Electrothermal Deicing ("PETD"). PETD provides ice removal, for example, by thermally modifying interfacial ice at the interface between an object and ice (also referred to herein as "ice-object interface"). Heating energy may be applied to the interface to melt an interfacial layer of ice; such application may be limited in duration so that heating energy applied to the interface has a heat diffusion distance within the ice that extends no more than through the thickness of the interfacial layer of ice.

Interfacial ice undergoes almost instant melting by applying a high-power heating pulse to the interface between ice and the object to which ice adheres. When a constant power density W (in watts/m²) is applied to an interface, an energy Q (in joules) required to heat the interface by $\Delta T$ degrees is approximately inversely proportional to the power density W. Thus, by applying a very high power density W to an interface to be deiced, energy Q is reduced, as compared to energy consumed by conventional (low-to-moderate power) electrothermal deicers. Typically, up to 99% of the heating and re-cooling energy can be saved by using a very high power density W.

But use of these energy saving principles with $Q \propto 1/W$ does not infinitely reduce Q, because a smaller Q reduces the time it takes for the interface to refreeze. Because of this fast interfacial refreezing - which serves to re-catch or re-generate ice—when PETD is used, the ice should be promptly removed from the surface by some force: gravity force, air drag force, mechanical scraping, etc.

If ice is not removed, the interface may refreeze over a time period ranging from milliseconds to approximately thirty seconds, depending on outside temperature, pulse duration, and substrate properties. Interfacial refreezing restricts use of PETD in applications where there is little or no ice-removing force, such as, for example, stagnation lines of airplane wings, horizontal surfaces of roads, airport runways, heat exchangers of refrigerators, and flat roofs.

Ice-making Systems Utilizing PETD

Ice melting may also be used in ice making; that is, by melting an interfacial layer of ice between ice cubes and an ice tray holding the ice cubes, then the cubes may be removed more easily. Ice-making systems employing PETD to facilitate ice harvesting is now next described.

Figure 1:
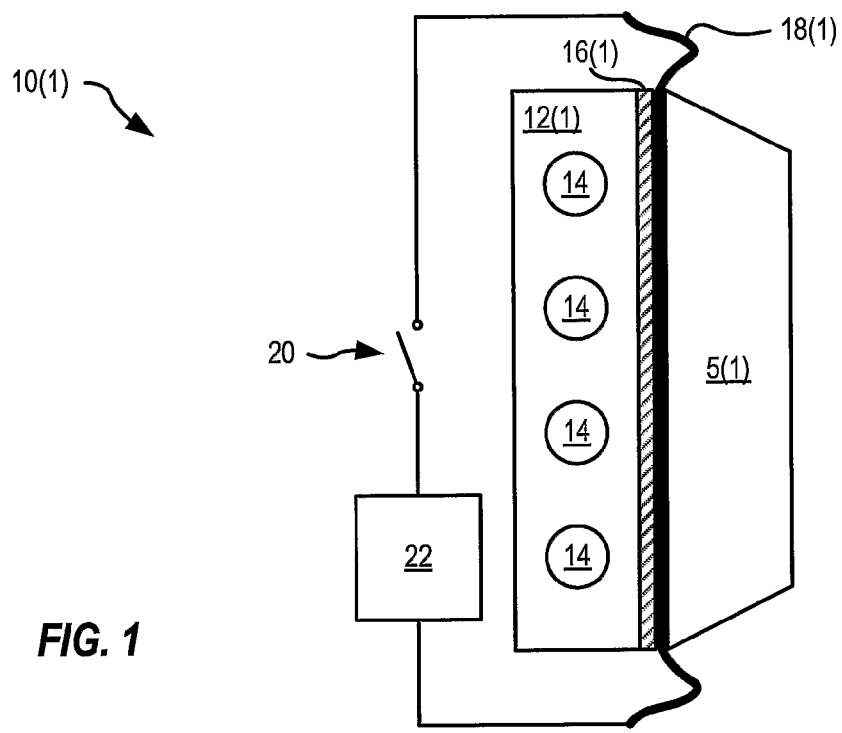
FIG. 1 shows one exemplary embodiment of an ice-making system that uses pulse electrothermal de-icing ("PETD").
Figure 2:
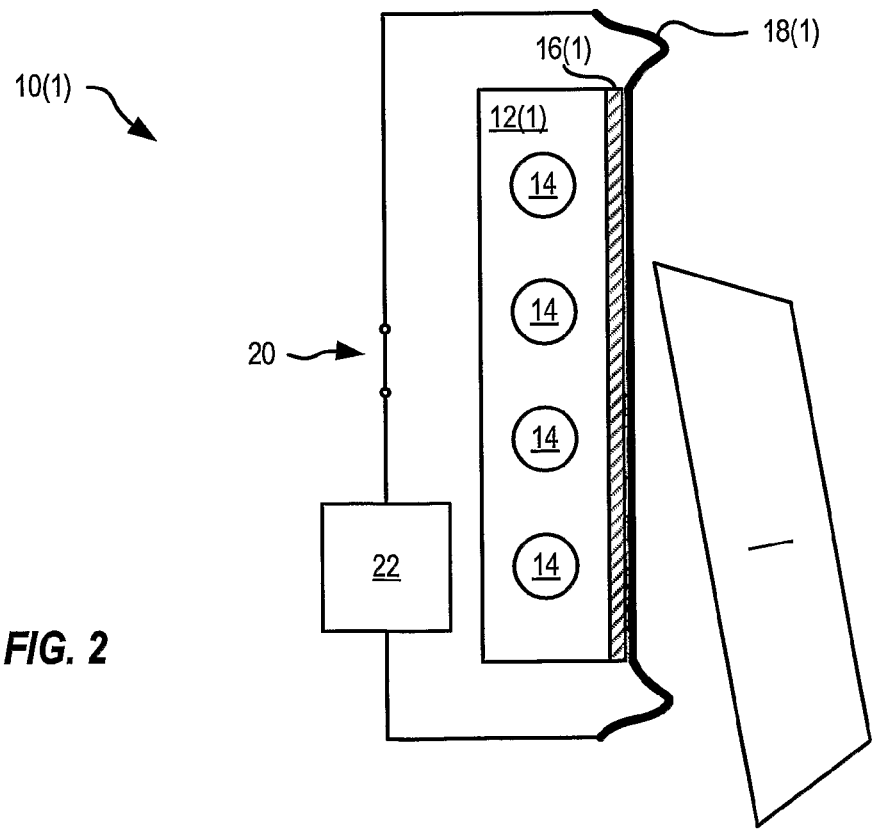
FIG. 2 shows the ice-making system of FIG. 1 illustrating use of pulse electrothermal de-icing to detach ice.

FIG. 1 and FIG. 2 show an exemplary ice-making system 10(1) that employs pulse electrothermal de-icing ("PETD"). In system 10(1), ice 5(1) forms on a foil 18(1) attached to a cold plate 12(1) by a thin dielectric film 16(1). Cold plate 12(1) is, for example, cooled by a fluid passing through conduits 14. Ice 5(1) grows from water (not shown) running across foil 18(1) from top to bottom. Foil 18(1) is for example a thin metal foil. Foil 18(1) is cooled by cold plate 12(1) through thin dielectric film 16(1) that is, for example, a thin layer of dielectric material. Ice 5(1) may also be grown from water that fills a container formed of foil 18(1), for example when cold plate 12(1) is oriented in a horizontal position. Once sufficient ice has been grown, a heating pulse of electric current is applied across foil 18(1) by closing a switch 20 that connects a power supply 22 to foil 18(1). The pulse melts interfacial ice adjacent to foil 18(1), allowing ice 5(1) to detach from foil 18(1). Ice 5(1) may, for example, collect in a container (not shown) beneath ice-making system 10(1).

Power supply 22 may be a regular AC power outlet, or a DC-power supply such as a battery, a capacitor or an ultracapacitor. Switch 20 may be a semiconductor switch (power- MOSFET, IGBT, thyristor, etc.), a mechanical switch, an electromagnetic switch, or any combination of the above.

In one embodiment, the applied voltage and current provides a density of heating power (relative to area of foil 18(1)) in an approximate range of 1 kw/m² to 500 kw/m². Power supply 22 may generate either AC or DC with a voltage between approximately 2.5V to approximately 1000V, depending on electrical resistance of foil 18(1). Foil 18(1) may be formed by sputtering, by physical vapor deposition (PVD), by chemical vapor deposition (CVD), by an electrolysis process and/or by another process for forming a thin metallic film.

In one embodiment, thickness of foil 18(1) may be in a range from approximately 0.5 μm to approximately 1 mm. In certain embodiments, foil 18(1) may be formed of conductive paint, conductive polymer film, carbon-fiber composite material, or carbon nanotube composite material.

Dielectric film 16(1) electrically isolates foil 18(1) from cold plate 12(1). Dielectric film 16(1) may be made, for example, of dielectric materials such as ceramic, glass, rubber, polymers, composite materials, and/or other dielectric materials. Typically, a thickness of thin dielectric-film 16(1) is in a range of approximately from 10 μm to 2 mm. Heating-pulse duration is typically in a range from 1 ms to 30 s; however, a range of 1 ms to 10 s may suffice.

Figure 3:
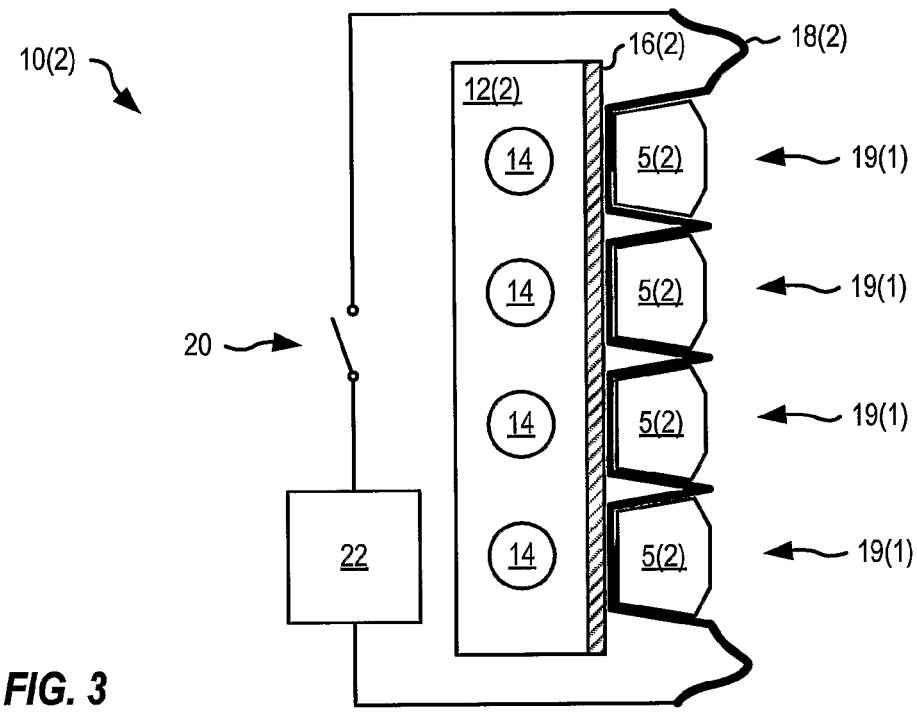
FIG. 3 shows one exemplary embodiment of an ice-making system that uses pulse electrothermal de-icing.
Figure 4:
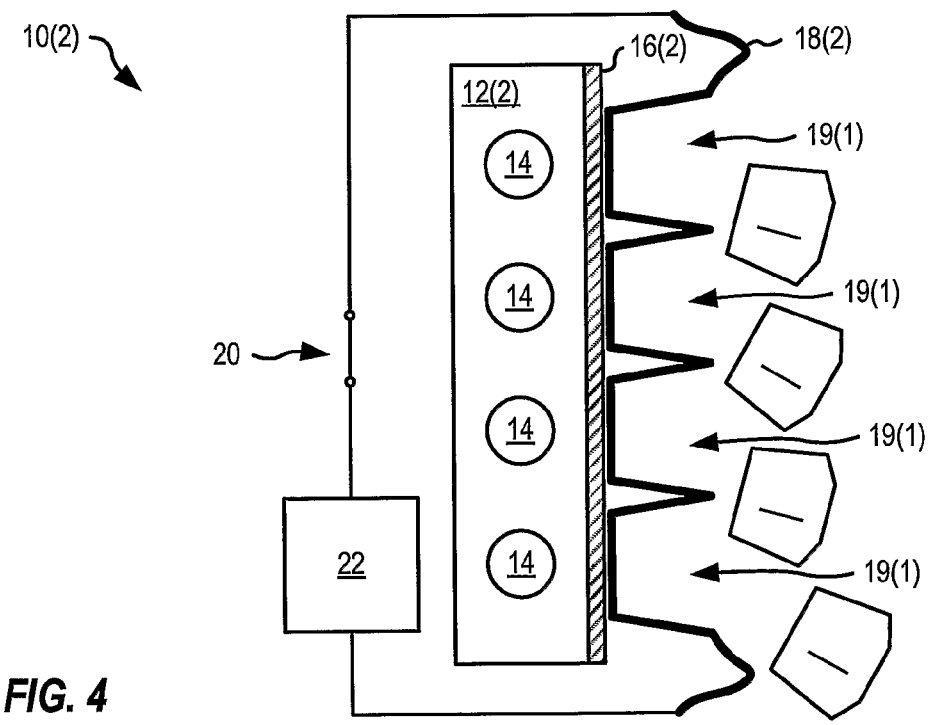
FIG. 4 shows the ice-making system of FIG. 3 illustrating use of pulse electrothermal de-icing to detach ice.

Operation of system 10(1) may be optimized to consume minimum electric energy, and to provide sufficient time for ice 5(1) to slide off foil 18(1) and cold plate 12(1) before an interface between ice 5(1) and foil refreezes. Parameters that may be optimized for operation of system 10(1) for example are:

a) Cold-plate 12(1) temperature
b) Dielectric film 16(1) thickness, density, heat capacity, and thermal conductivity
c) Metal foil/film 18(1) thickness, density, electrical resistance and heat capacity
d) Ice 5(1) density, latent heat of melting, heat capacity, and thermal conductivity
e) Melted layer thickness
f) Melted layer refreezing time
g) Density of heating power FIG. 3 and FIG. 4 show another exemplary ice-making system 10(2) that employs PETD. System 10(2) has a cold plate 12(2) and a dielectric film 16(2), and has conduits 14, a power supply 22 and a switch 20 that are the same as like numbered items in system 10(1). In system 10(2), ice "cubes" 5(2) (which may or may not be cubes in a geometric sense) form on a foil 18(2) that is shaped to form pockets 19(1) for ice growth. Pockets 19 may fill with water running from the top of foil 18(2), or in case of a horizontal cold plate 12(2), pockets 19 may fill with still water. Water may first begin to freeze at a surface of each pocket that is in best thermal contact with the cold plate. When sufficient ice forms in pockets 19(1), a heating pulse of electric current heats the heater foil and melts interfacial ice, allowing ice "cubes" 5(2) to detach from pockets 19(1). The cycle of freezing and releasing ice may then repeat.

Figure 5:
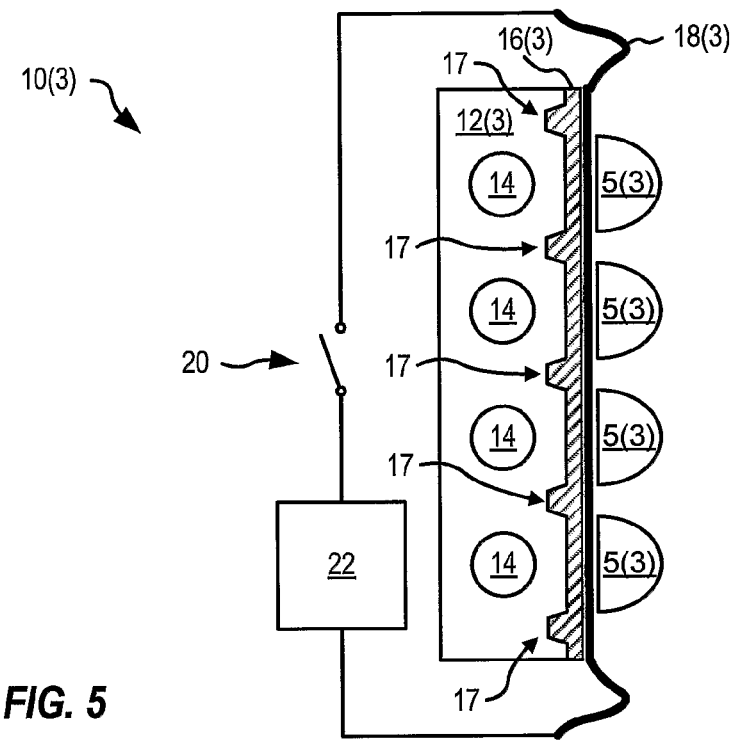
FIG. 5 shows one exemplary embodiment of an ice-making system that uses pulse electrothermal de-icing.
Figure 6:
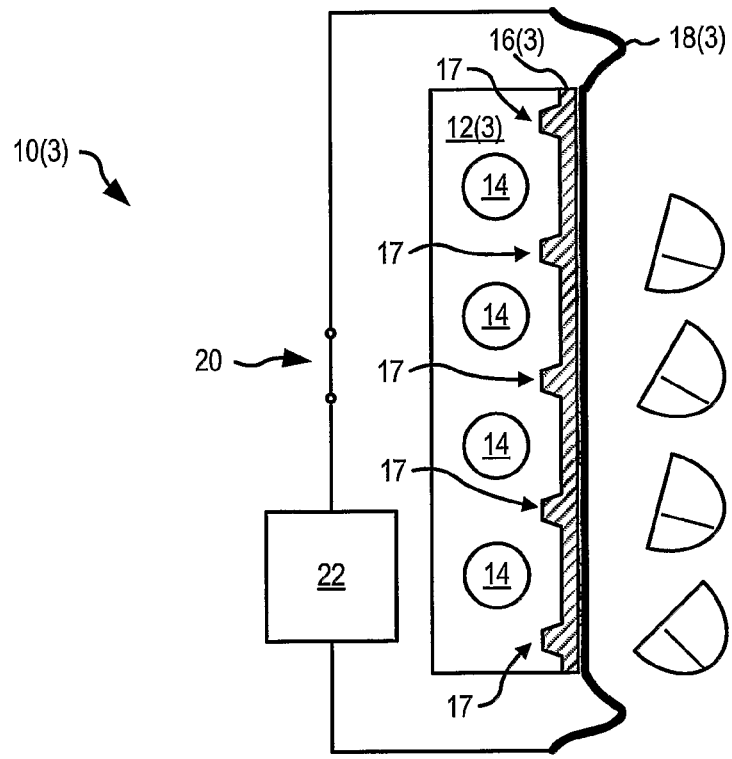
FIG. 6 shows the ice-making system of FIG. 5 illustrating use of pulse electrothermal de-icing to detach ice.

FIG. 5 and FIG. 6 show another exemplary ice-making system 10(3) that employs PETD. System 10(3) has a cold plate 12(3) and a dielectric film 16(3), and has conduits 14, a power supply 22 and a switch 20 that are the same as like numbered items in systems 10(1) and 10(2). In ice-making system 10(3), a variable thickness of dielectric film 16(3) modulates a heat flux that is directed from ice 5(3) growing on a foil 18(3) to cold plate 12(3). Dielectric film 16(3) has low thermal conductivity, so the heat flux is greater where film 16(3) is thin (e.g., where ice 5(3) is shown) and is reduced where film 16(3) is thick (e.g., locations 17). An ice growth rate is proportional to a difference between the heat flux sinking to cold plate 12(3) and the heat flux from water that runs from the top to the bottom of cold plate 12(3). In locations 17, where film 16(3) is thick, the running water brings more heat than can sink into cold plate 12(3), thus preventing ice growth. When ice 5(3) grows to a desired thickness, a heating pulse releases ice 5(3), as shown in FIG. 6.

It will be appreciated that areas of thick dielectric may form within channels in a cold plate (e.g., like locations 17 in FIG. 5 and FIG. 6) or may form from a raised dielectric surface, or combinations thereof. Depending on a particular pattern of dielectric, it is possible to grow ice shapes that may be semi-spheres, semi-cylinders, ice rectangles, ice bars, ice stars, etc. When metal foil 16(3) is very thin but has relatively low thermal conductivity (e.g., stainless steel), lateral heat flux (e.g., along the foil) is limited, leading to ice-free spaces between adjacent ice shapes. When a metal foil is thick and/or has high thermal conductivity, lateral heat flux can make the rate of ice growth over the entire foil area even, leading to ice shapes that are frozen together.

While ice-making systems 10(1), 10(2) and 10(3) may have many advantages (such as, for example, an absence of moving parts, rapid ice release, low energy consumption, and almost uninterrupted ice growth) they may also have certain disadvantages. One disadvantage is that a dielectric film that electrically separates the cold plate from the metal foil also impedes a heat exchange that is necessary for ice growth. Typically, thermal resistance of a dielectric film such as films 16(1), 16(2) or 16(3) is equivalent to a thermal resistance of 0.5 mm to 2 mm of ice. Accordingly, during each ice-growth cycle, from 0.5 mm to 2 mm of ice thickness is lost due to the presence of that dielectric film. Also, during a heating pulse, a small amount of the heat escapes through the dielectric film to the cold plate, thus increasing the total electric energy requirement. Another potential disadvantage of systems 10(1), 10(2) and 10(3) may be a difference in coefficients of thermal expansion (CTE) of foils 18 and that of dielectric layers 16. These two CTEs should either match well to avoid large interfacial stress induced by heating pulses, or, an elastic modulus of dielectric layers 16 should be low, to limit thermally-induced stress.

Figure 7:
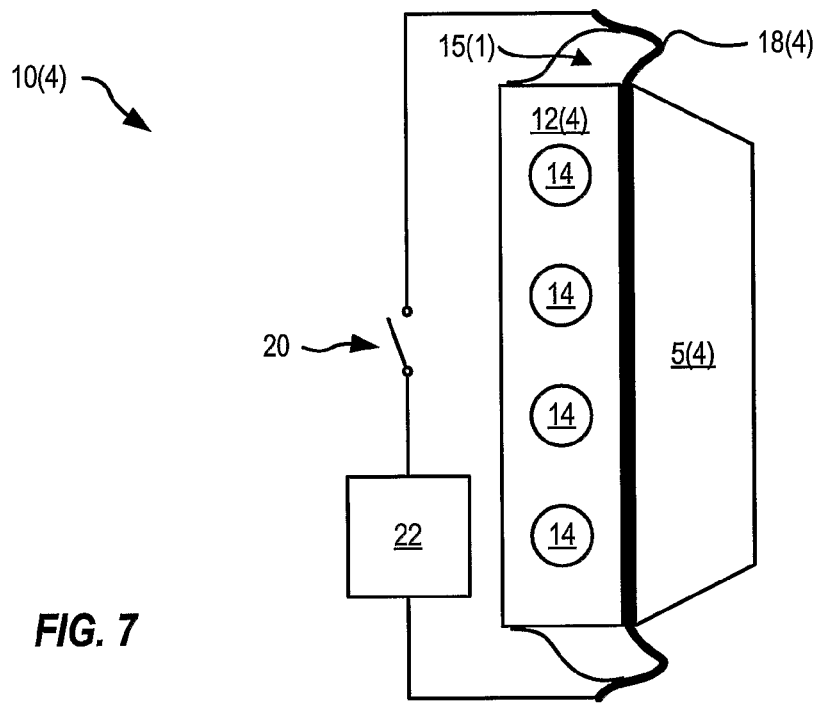
FIG. 7 shows one exemplary embodiment of an ice-making system that uses pulse electrothermal de-icing.
Figure 8:
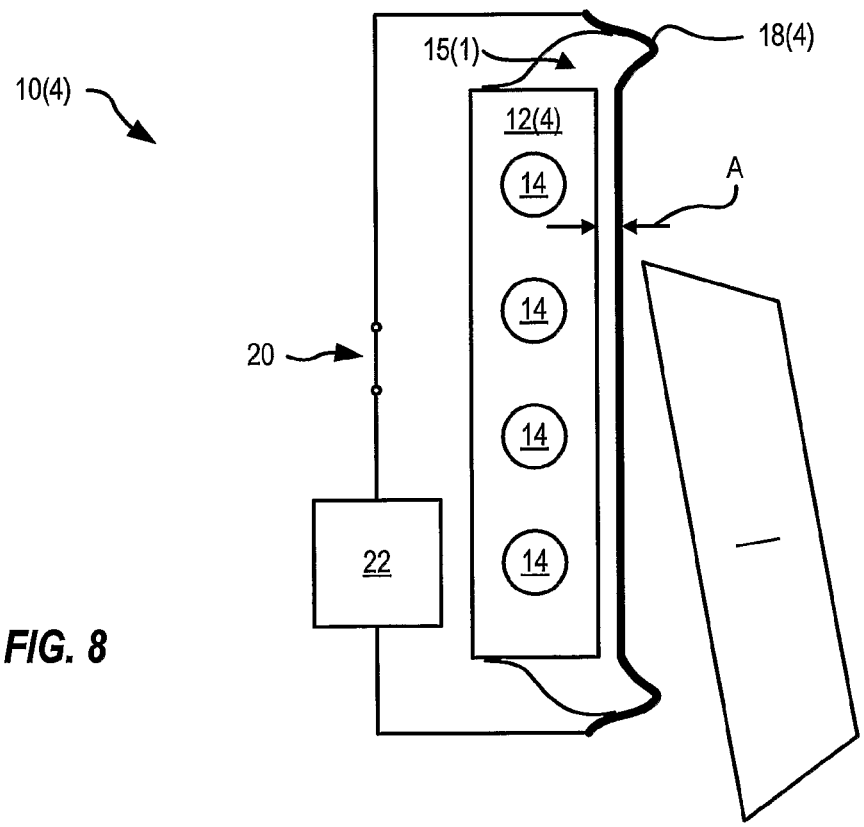
FIG. 8 shows the ice-making system of FIG. 7 illustrating use of pulse electrothermal de-icing to detach ice.

The ice-making systems shown in FIG. 7 through FIG. 12 remove the above-mentioned disadvantages by removing dielectric layers 16. For example, FIG. 7 and FIG. 8 show another exemplary ice-making system 10(4) that employs PETD. System 10(4) has a cold plate 12(4) and has conduits 14, a power supply 22 and a switch 20 that are the same as like numbered items in systems 10(1), 10(2) and 10(3). System 10(4) is similar to system 10(1) except that (a) system 10(4) has no dielectric film, and (b) system 10(4) has a space 15(1) sealed between a cold plate 12(4) and a foil 18(4). Space 15(1) may be, alternately, evacuated or filled with air. When space 15(1) is evacuated, atmospheric pressure presses foil 18(4) against cold plate 12(4), providing thermal contact so that ice can grow on foil 18(4). To harvest ice, air is pumped into space 15(1), separating and interrupting thermal contact between cold plate 12(4) from foil 18(4). A piston, moving inside a cylinder and driven by an electromagnet, for example, can be used as a pump for system 10(4); other pumps may also be used for this purpose. When air separates foil 18(4) from cold plate 12(4), an air gap dimension indicated by arrows A in FIG. 8 may be in an approximate range of 10 μm to 2 cm. After cold plate 12(4) and foil 18(4) are separated, a heating pulse is applied to foil 18(4) to melt interfacial ice; at which time ice 5(4) slides down to an ice collector.

Figure 9:
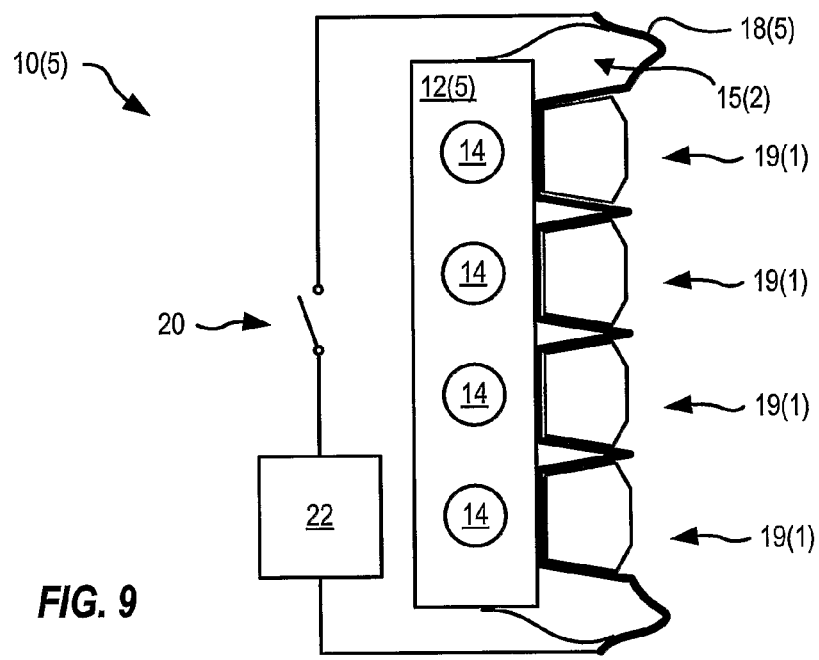
FIG. 9 shows one exemplary embodiment of an ice-making system that uses pulse electrothermal de-icing.
Figure 10:
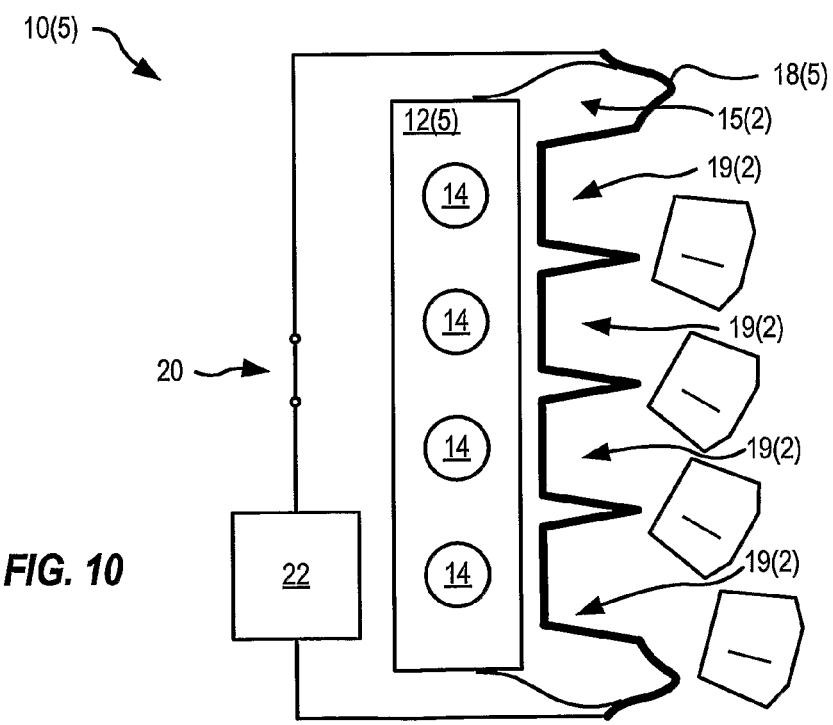
FIG. 10 shows the ice-making system of FIG. 9 illustrating use of pulse electrothermal de-icing to detach ice.

FIG. 9 and FIG. 10 show another exemplary ice-making system 10(5) that employs PETD. System 10(5) has a cold plate 12(5) with an adjacent space 15(2), and has conduits 14, a power supply 22 and a switch 20 that are the same as like numbered items in systems 10(1)-10(4). System 10(5) is similar to system 10(4), but has a foil 18(5) that forms pockets 19(2) for ice "cubes" 5(5) to grow in. Pockets 19(2) may fill either with water running from the top of the device, or they may be pre-filled with still water if cold plate 12(5) is horizontal. By pumping air in or out of space 15(2), foil 18(5) can be brought in or out of thermal contact with cold plate 12(5). This thermal contact is "on" when system 10(5) grows ice, and it is "off" just prior to a heating pulse applied to film 18(5) that releases ice "cubes" 5(5).

Figure 11:
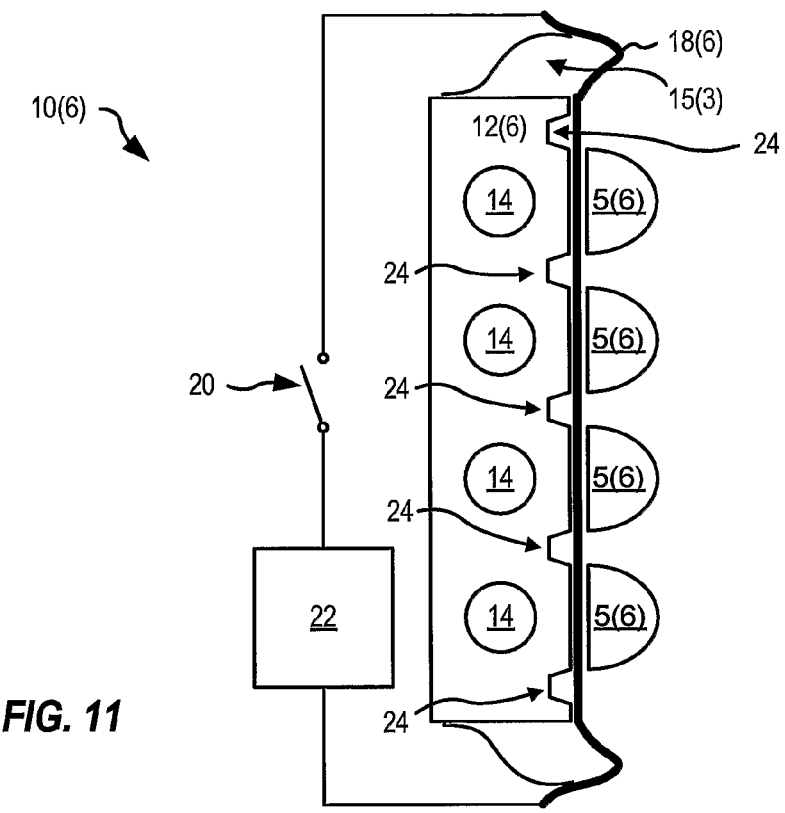
FIG. 11 shows one exemplary embodiment of an ice-making system that uses pulse electrothermal de-icing.
Figure 12:
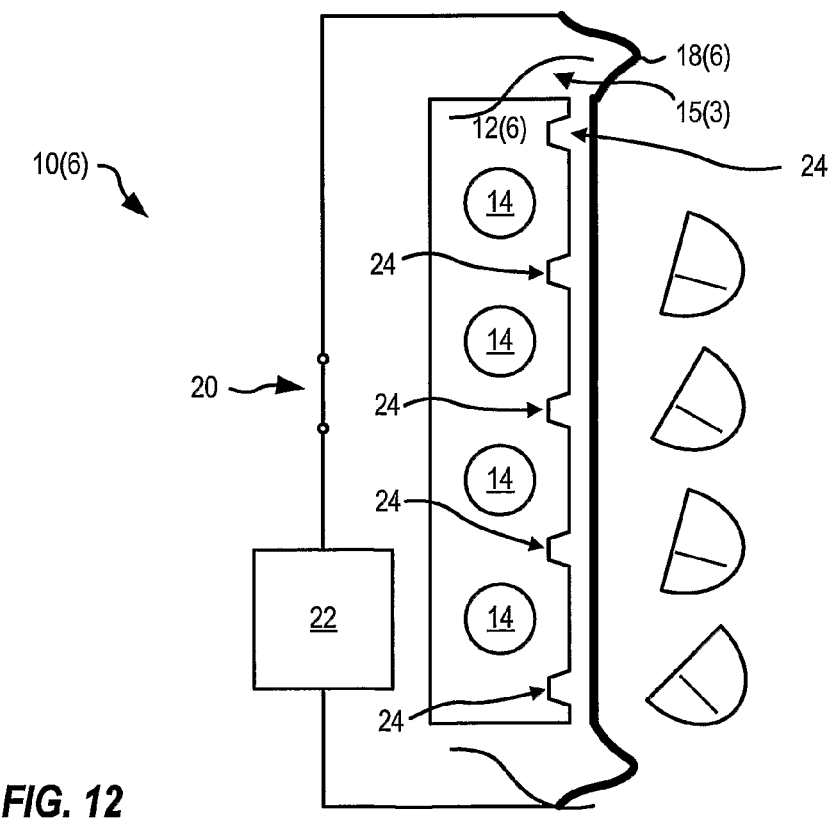
FIG. 12 shows the ice-making system of FIG. 11 illustrating use of pulse electrothermal de-icing to detach ice.

FIG. 11 and FIG. 12 show another exemplary ice-making system 10(6) that Employs PETD. System 10(6) has a cold plate 12(6) with an adjacent space 15(3), and has conduits 14, a power supply 22 and a switch 20 that are the same as like numbered items in systems 10(1)-10(5). In system 10(6), heat exchange between cold plate 12(6) and a foil 18(6) is modulated by grooves 24 formed in cold plate 12(6). Grooves 24 change local ice-growth rates in a way similar to the operation of system 10(3) (FIGS. 5 and 6). As discussed above with respect to FIG. 5 and FIG. 6, modulation of heat exchange may enable growth of ice pieces of various shapes: semi-spheres, cubes, stars, etc. An air pumping system (not shown) may operate in coordination with a pulse deicing system formed by the systems of FIG. 7—FIG. 9, to separate foil 18(6) from cold plate 12(6) prior to releasing ice "cubes" 5(6) with a heating pulse.

EXAMPLE 1

An example provides illustrative (non-limiting) specification and performance Parameters of system 10(1) shown in FIG. 1 and FIG. 2. The following parameters are used as input for these calculations:

TABLE 1

Constants and Variables used in Example 1

| Item | Symbol | Value |
| --- | --- | --- |
| Cold plate 12(1) temperature (below 0 C.) | $\Delta T$ | 18K |
| Dielectric film 16(1) material: | | epoxy resin |
| Dielectric film 16(1) thickness | d | variable |
| Dielectric film 16(1) density: | $\rho_d$ | 1200 kg/m$^3$ |
| Dielectric film 16(1) heat capacity: | $C_d$ | 10$^3$ J/(kg · K) |
| Dielectric film 16(1) thermal conductivity: | $\lambda_d$ | 0.2 W/(m · K) |
| Foil 18(1) material: | | stainless steel foil |
| Foil 18(1) thickness: | $d_h$ | 50 µm |
| Foil 18(1) density: | $\rho_h$ | 7800 kg/m$^3$ |
| Foil 18(1) heat capacity: | $C_h$ | 450 J/(kg · K) |
| Foil 18(1) area | S | 0.645 m$^2$ |
| Power density applied to the heater-film | W | variable |
| Time over which heating pulse is applied | t | variable |
| Ice 5(1) density | $\rho_i$ | 920 kg/m$^3$ |
| Ice 5(1) thermal conductivity | $\lambda_i$ | 2.2 W/(m · K) |
| Ice 5(1) heat capacity | $C_i$ | 2.2 · 10$^3$ J/(kg · K) |
| Water density | $\rho_w$ | 1000 kg/m$^3$ |
| Latent heat of ice melting 5(1) | $q_{latent}$ | 3.33 · 10$^5$ J/kg |
| Desired thickness of melted ice layer: | $l_m$ | 0.2 mm |
| Desired time before refreezing of the melted layer | $t_r$ | >2 s |

The following equations were used to calculate performance parameters for system 10(1). A heat diffusion coefficient Di for ice is calculated as:

$$D_i = \frac{\lambda_i}{\rho_i \cdot C_i} \qquad \text{Eq. 1}$$

A heat diffusion coefficient $D_d$ for epoxy resin is calculated as:

$$D_d = \frac{\lambda_d}{\rho_d \cdot C_d} \qquad \text{Eq. 2}$$

A heat diffusion length $L_d(t)$ in epoxy resin is calculated as:

$$L_d(t) = \sqrt{D_d \cdot t} \qquad \text{Eq. 3}$$

A heat diffusion length $L_i(t)$ in ice is calculated as:

$$L_i(t) = \sqrt{D_i \cdot t} \qquad \text{Eq. 4}$$

Figure 13:
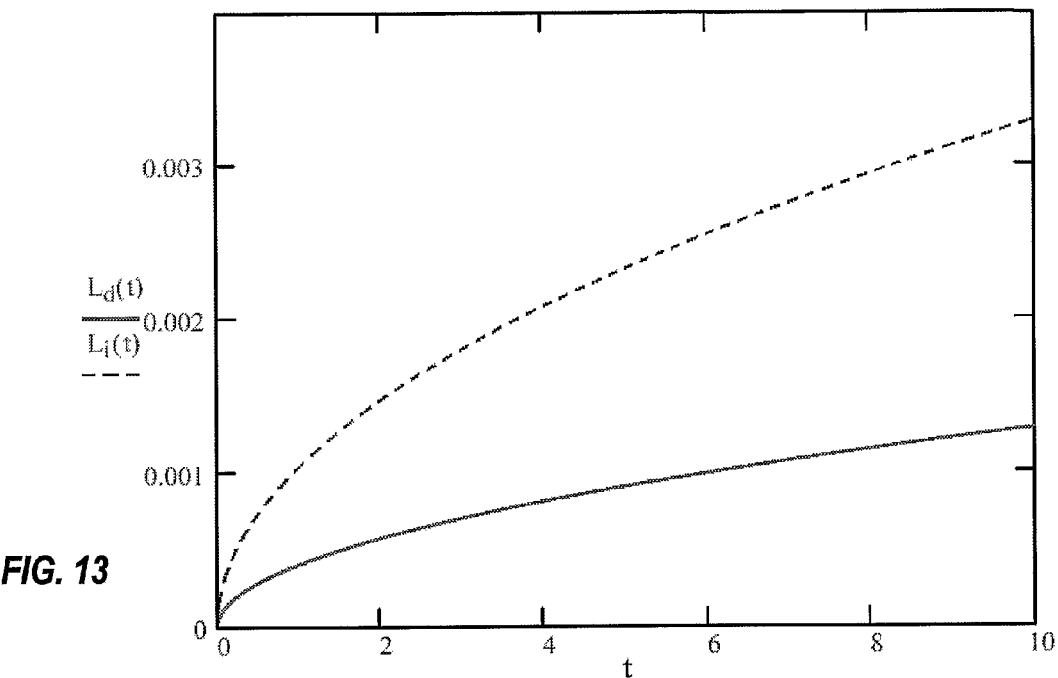
FIG. 13 illustrates dependence of heat diffusion length in epoxy resin ($L_d$), and heat diffusion length in ice ($L_i$) on pulse duration for the ice-making system of FIG. 1.

FIG. 13 illustrates dependence of heat diffusion length $L_d(t)$ in epoxy resin and heat diffusion length $L_i(t)$ in ice on pulse duration t for ice-maker 10(1). A pulse duration of one to three seconds is seen to limit the diffusion of heat within 2 mm in each of epoxy and ice; shorter pulses limit the diffusion of heat to shorter distances.

A total energy Q used to heat an interface later and a heater to 0 C. and to melt a layer of ice with melted layer thickness $l_m$ can be calculated using energy conservation principles. Intermediate parameters may be defined as:

$$b(W, d) = \frac{\sqrt{\lambda_i \cdot \rho_i \cdot C_i}}{\sqrt{W - \frac{\Delta T \cdot \lambda_d}{2d}}} \cdot \Delta T \cdot \frac{\sqrt{\pi}}{2} \qquad \text{Eq. 5}$$

-continued $$C(l_m, d) = C_h \cdot \rho_h \cdot d_h \cdot \Delta T + (\rho_w \cdot l_m \cdot q_{latent}) + \frac{\Delta T \cdot \rho_d \cdot d \cdot C_d}{2} \quad \text{Eq. 6}$$

A heating pulse energy Q required to achieve the desired melted layer thickness $l_m$ is calculated as:

$$Q(W, d, l_m) = S \cdot \left( \frac{b(W, d)}{2} + \sqrt{\frac{b(W, d)^2}{4} + c(l_m, d)} \right)^2 \quad \text{Eq. 7}$$

A pulse duration t required to provide pulse energy Q is calculated as:

$$t(W, d, l_m) = \frac{Q(W, dl_m)}{S \cdot W} \quad \text{Eq. 8}$$

A cleaning speed $S_s$ at which ice is harvested from cold plate 12(1) is calculated as:

$$S_s(W, d, l_m) = \frac{S}{t(W, d, l_m)} \quad \text{Eq. 9}$$

A cleaning time T required to harvest ice from cold plate 12(1) is calculated as:

$$T(W, d, l_m) = \frac{S}{S_s(W, d, l_m)} \quad \text{Eq. 10}$$

As shown that in this example, over 50% of the heating pulse energy Q is consumed in melting interfacial ice, with smaller amounts of energy consumed by heating cold plate 12(1), dielectric film 16(1) and foil 18(1), and heating ice 5(1) (i.e., raising the temperature of adjacent ice 5(1) above its initial value of −18 C. but not melting it).

Figure 14:
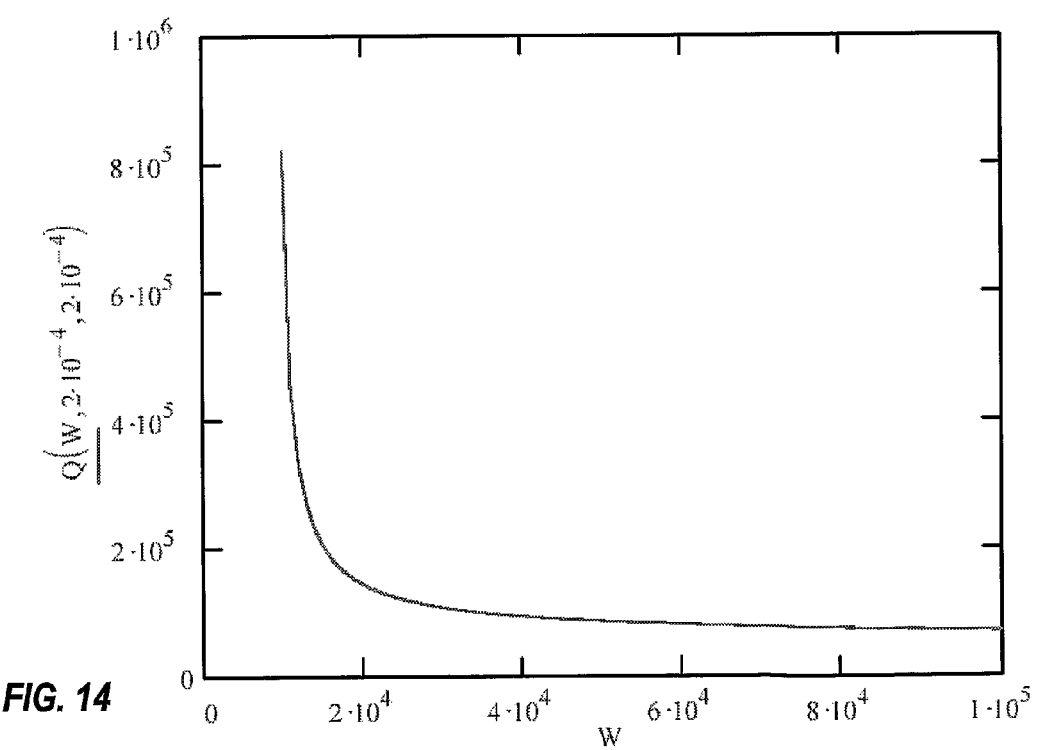
FIG. 14 illustrates dependence of total energy on power for the ice-maker of FIG. 1.

FIG. 14 illustrates dependence of total energy Q on power W for ice-making system 10(1), with Q and W given per square meter $$\left( \frac{1}{m^2} \right).$$

Figure 15:
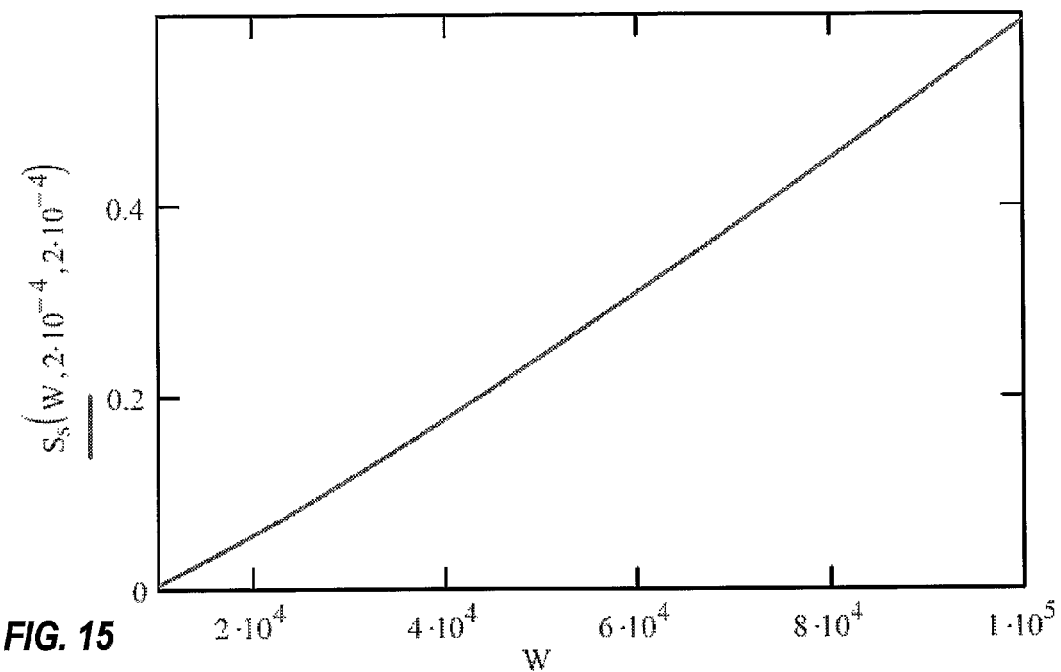
FIG. 15 illustrates dependence of cleaning speed on power density for the ice-making system of FIG. 1.
Figure 16:
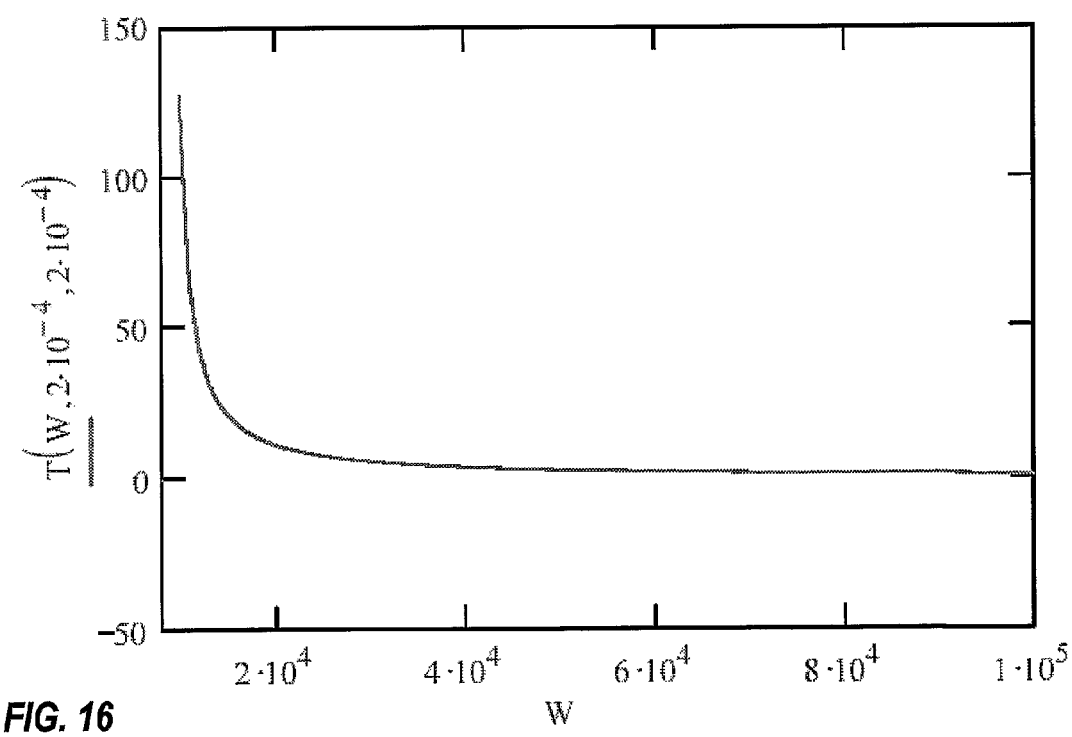
FIG. 16 illustrates dependence of cleaning time on power density for the ice-making system of FIG. 1.

It is appreciated from Eq. 5 and Eq. 6 that higher values of W will result in smaller values of Q. Given the values of the constants used in Example 1, Q falls off dramatically as W increases to about $2 \cdot 10^4$. FIG. 15 illustrates dependence of cleaning speed $S_s$ on power W for ice-making system 10(1). Given the values of the constants used in Example 1, $S_s$ increases with W. FIG. 16 illustrates dependence of cleaning time T on power W for ice-maker 10(1). Given the values of the constants used in Example 1, Q falls off as W increases to about $$2 \cdot 10^4 \frac{W}{m^2}.$$

Another parameter for icemaking operation is a refreezing time of a melted ice interface; the refreezing time may define a time period in which the melted interface facilitates ice harvesting (e.g., because the melted interface allows the ice to slide freely). A refreezing time $t_r$ can be calculated for ice-making system 10(1) by assuming that refreezing occurs when a latent heat of melting $q_{latent}$ in the melted region dissipates into adjacent ice 5(1) and through foil 18(1) and dielectric layer 16(1) into cold plate 12(1). Intermediate parameters may be defined as:

$$b(d) = \frac{\lambda d}{d\sqrt{\lambda_i \cdot \rho_i \cdot C_i}} \quad \text{Eq. 11}$$

$$t(W, d, l_m) = \frac{Q(W, d, l_m)}{S \cdot W} \quad \text{Eq. 12}$$

$$a(W, d, l_m) = \sqrt{t(W, d, l_m)} + \frac{\rho_w \cdot l_m \cdot q_{latent}}{\Delta T \cdot \sqrt{\lambda_i \cdot \rho_i \cdot C_i}} \quad \text{Eq. 13}$$

Refreezing time $t_r$ can be calculated as:

$$t_r(W, d, l_m) = \frac{a(W, d, l_m)}{b(d)} + \frac{1}{2 \cdot b(d)^2} - \sqrt{\left( \frac{a(W, d, l_m)}{b(d)} + \frac{1}{2 \cdot b(d)^2} \right)^2 + \frac{t(W, d, l_m)}{b(d)^2} - \frac{a(W, d, l_m)^2}{b(d)^2}} \quad \text{Eq. 14}$$

Figure 17:
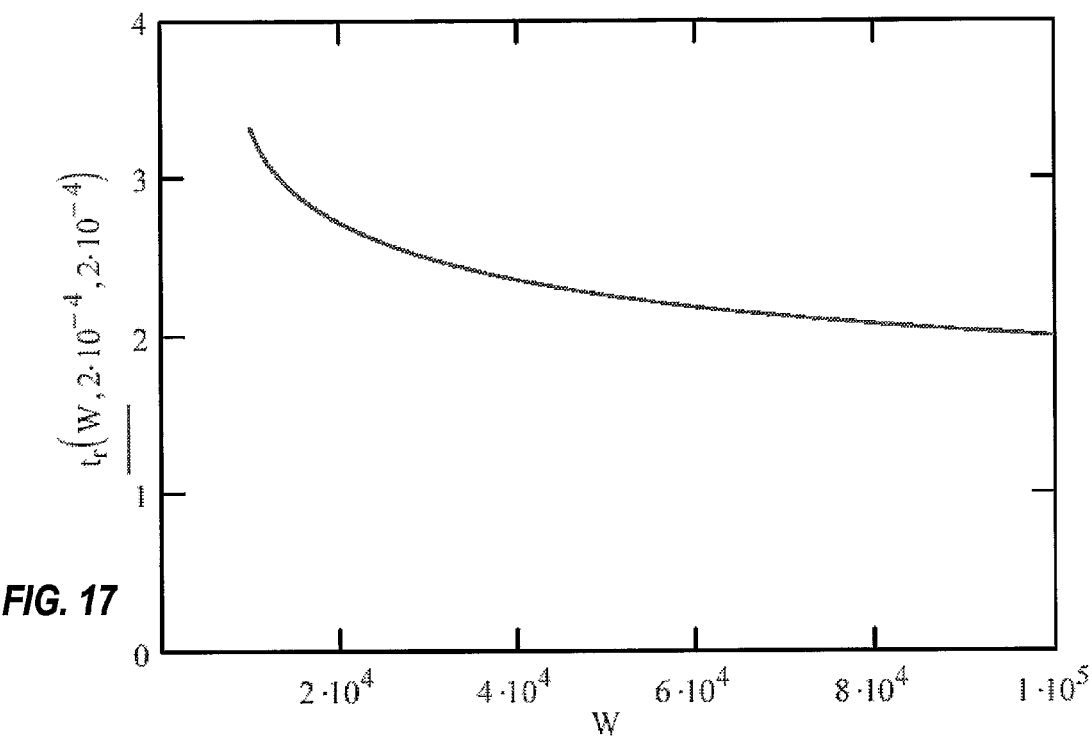
FIG. 17 illustrates dependence of refreezing time (s) on power density for the ice-making system of FIG. 1 with a dielectric thickness of 0.2 mm.
Figure 18:
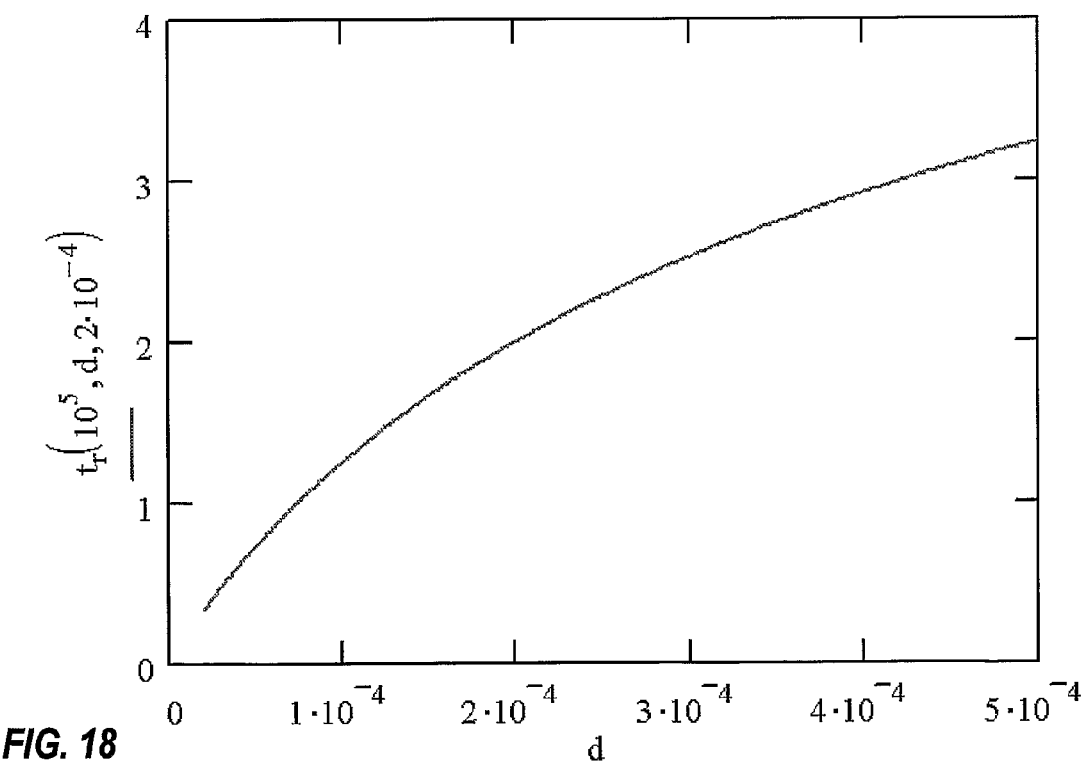
FIG. 18 illustrates dependence of refreezing time on dielectric thickness d (m) for the ice-making system of FIG. 1.
Figure 19:
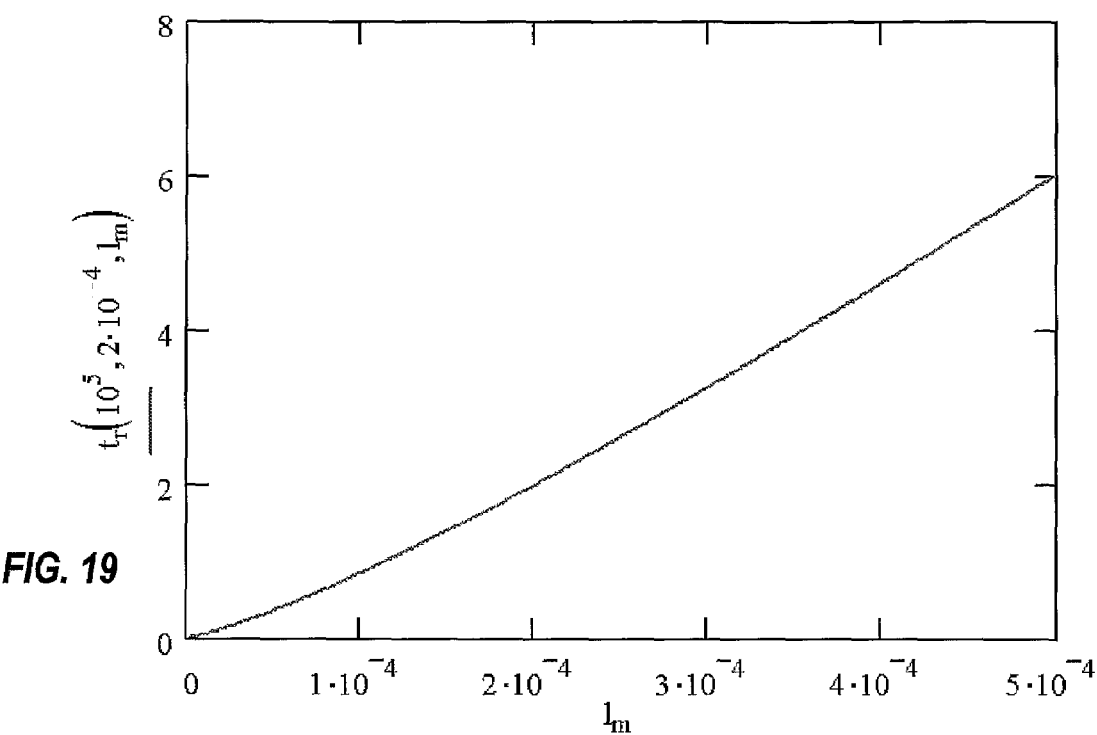
FIG. 19 illustrates dependence of refreezing time on melted layer thickness for the ice-making system of FIG. 1 with a dielectric thickness d of 0.2 mm.

FIG. 17 illustrates dependence of refreezing time $t_r$ on power density W for ice-making system 10(1) with a dielectric thickness d of 0.2 mm. Given the values of the constants used in Example 1, $t_r$ decreases as W increases (e.g., since higher W reduces Q for a given melted layer thickness $l_m$, as seen from FIG. 14; higher W also reduces refreezing time) but $t_r$ remains greater than 2s for values of W up to about $10^5$ watts/m². FIG. 18 illustrates dependence of refreezing time $t_r$ on dielectric thickness d for ice-making system 10(1). Given the values of the constants used in Example 1, $t_r$ increases as d increases. FIG. 19 illustrates dependence of refreezing time $t_r$ on melted layer thickness $l_m$ for ice-making system 10(1) with a dielectric thickness d of 0.2 mm. Given the values of the constants used in Example 1, $t_r$ increases as $l_m$ increases.

One set of parameters that may be chosen as optimized parameters for Example 1 are:

TABLE 2

Optimized Parameters from Example 1

| Item | Symbol | Value |
| --- | --- | --- |
| Dielectric film 16(1) thickness: | d | 0.2 mm |
| Thickness of melted ice layer: | $l_m$ | 0.2 mm |
| Heating-pulse duration: | t | 1.08 s |
| Heating pulse energy per m² of foil 18(2) | Q/S | 108 kJ/m² |
| Average energy consumed by the ice releasing mechanism per square meter of the heater foil, when a heating pulse is applied every 30 minutes. | Q/1800S | 60 watt/m² |
| Density of power during a heating pulse: | W/S | 100 kW/m² |

TABLE 2-continued

Optimized Parameters from Example 1

| Item | Symbol | Value |
|---|---|---|
| Time before refreezing of the melted layer | $t_r$ | 1.999 s |

EXAMPLE 2

An example provides illustrative (non-limiting) specification and performance parameters of system 10(4) shown in FIG. 7 and FIG. 8. The following parameters are used as input for these calculations:

TABLE 3

Constants and Variables used in Example 2

| Item | Symbol | Value |
|---|---|---|
| Cold plate 12(1) temperature (below 0 C.) | ΔT | 18 K |
| Air gap width | d | variable |
| Air density: | $\rho_d$ | 1.3 kg/m³ |
| Air heat capacity: | $C_d$ | 10³ J/(kg · K) |
| Air thermal conductivity: | $\lambda_d$ | 0.023 W/(m · K) |
| Foil 18(4) material: | | stainless steel foil |
| Foil 18(4) thickness: | $d_h$ | 0.1 mm |
| Foil 18(4) density: | $\rho_h$ | 7800 kg/m³ |
| Foil 18(4) heat capacity: | $C_h$ | 450 J/(kg · K) |
| Foil 18(4) area | S | 0.645 m² |
| Power density applied to the heater-film | W | variable |
| Time over which heating pulse is applied | t | variable |
| Ice 5(4) density | $\rho_i$ | 920 kg/m³ |
| Ice 5(4) thermal conductivity | $\lambda_i$ | 2.2 W/(m · K) |
| Ice 5(4) heat capacity | $C_i$ | 2.2 · 10³ J/(kg · K) |
| Water density | $\rho_w$ | 1000 kg/m³ |
| Latent heat of ice melting 5(1) | $q_{latent}$ | 3.33 · 10⁵ J/kg |
| Desired thickness of melted ice layer: | $l_m$ | 0.2 mm |
| Desired time before refreezing of the melted layer | $t_r$ | >2 s |

Heat diffusion coefficients $D_i$, $D_d$ and heat diffusion lengths $L_i(t)$, $L_d(t)$ for ice and air are calculated as in Eq. 1-Eq. 4 above, using the constants and variables listed in Table 3 (with properties of air denoted by the subscript d).

Figure 20:
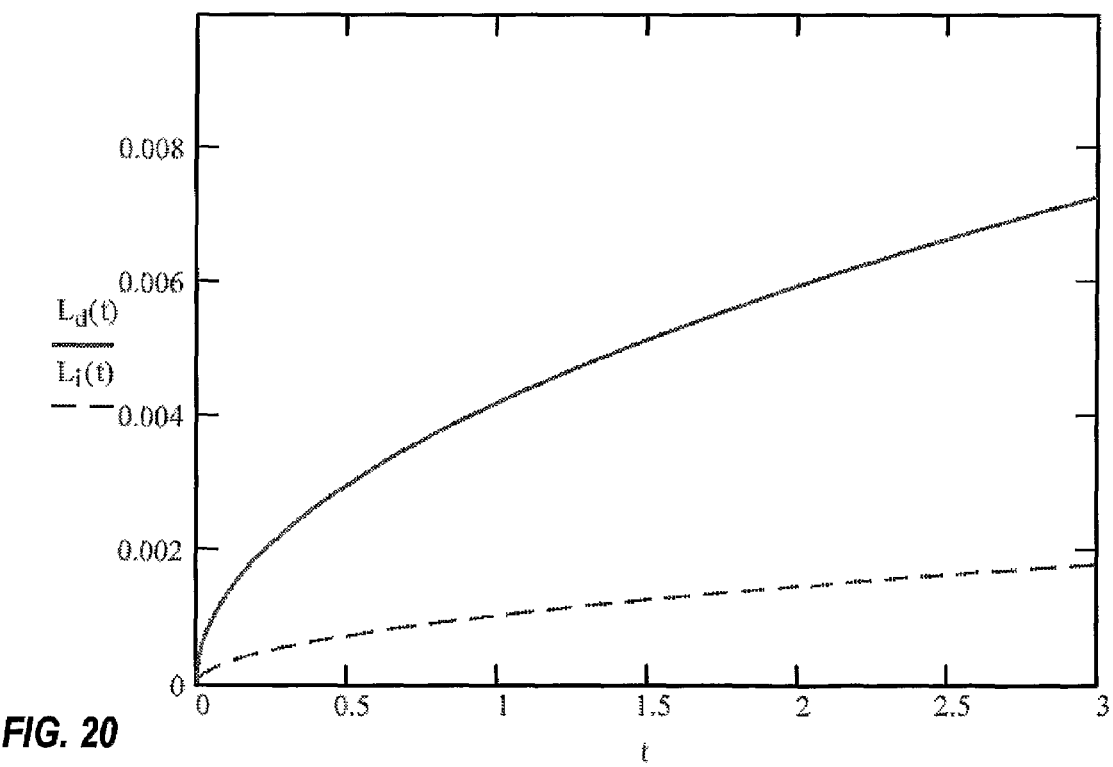
FIG. 20 illustrates dependence of $L_d(t)$ and $L_i(t)$ on pulse duration t for the ice-making system of FIG. 7.

FIG. 20 illustrates dependence of $L_d(t)$ and $L_i(t)$ on pulse duration t for Example 2. A pulse duration of one to three seconds is seen to limit the diffusion of heat within 2 mm in ice; shorter pulses limit the diffusion of heat to shorter distances.

Since foil 18(4) contacts cold plate 12(4) during ice making, but an air gap reduces heat transfer to cold plate 12(4) during ice harvesting, it is possible to configure the air gap to be wider than dielectric films 16 of ice-making systems 10(1)-10(3); such an air gap may, for example, be in the range of millimeters. A total energy Q used to heat an interface and a heater to 0 C. and to melt a layer of ice with melted layer thickness $l_m$, a pulse length t, a cleaning rate $S_s$ and a cleaning time T can be calculated using Eq. 5-Eq. 10 above, using the constants and variables listed in Table 3.

Figure 21:
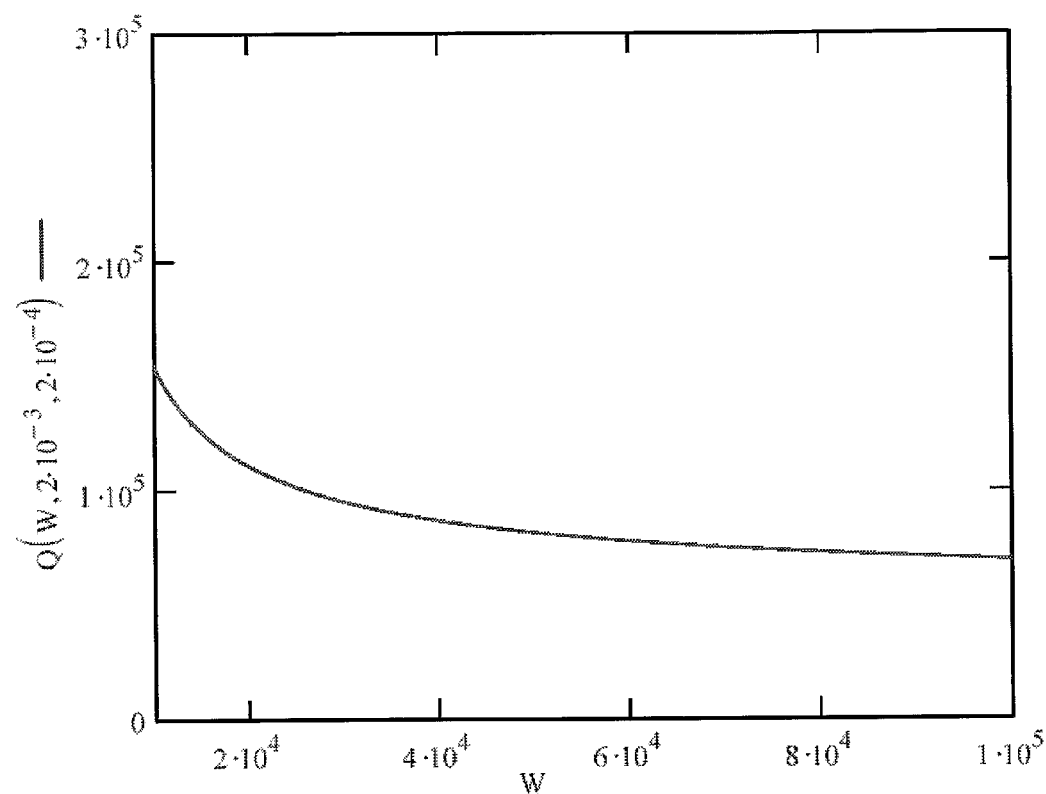
FIG. 21 illustrates dependence of total energy per $m^2$ Q on power density W in the ice-making system of FIG. 7 for an air gap of 2 mm.

FIG. 21 illustrates dependence of total energy Q on power density W in ice-making system 10(4) for an air gap of 2 mm. Given the values of the constants used in Example 2, Q falls off as W increases to about 2·10⁴.

Figure 22:
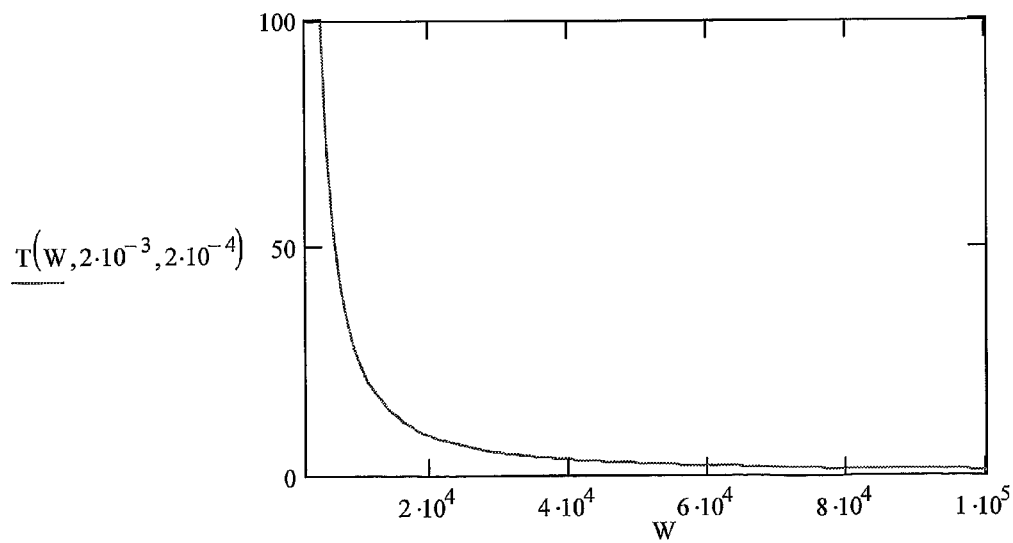
FIG. 22 illustrates dependence of the total cleaning time, T, on heating power density, W.

FIG. 22 illustrates dependence of the total cleaning time, T, on heating power density, W.

Figure 23:
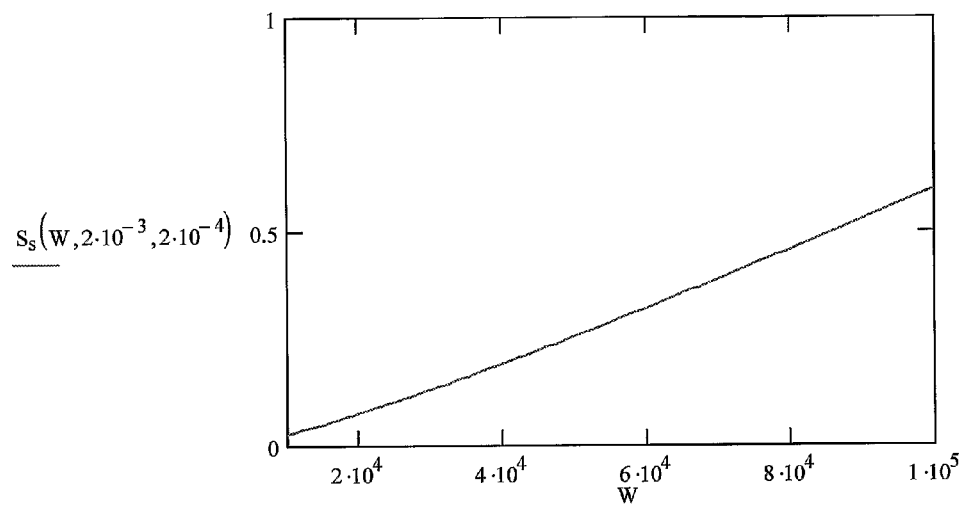
FIG. 23 illustrates dependence of the cleaning rate, $S_s$, on heating power density, W.

FIG. 23 illustrates dependence of the cleaning rate, $S_s$, on heating power density, W.

A refreezing time $t_r$ can be calculated for ice-making system 10(4) by assuming that refreezing occurs when a latent heat of melting $q_{latent}$ that exists in the melted region dissipates into adjacent ice 5(4) and through foil 18(4) and the air gap into cold plate 12(4). Intermediate parameters and refreezing time $t_r$ can be calculated using Eq. 11-Eq. 14 above, using the constants and variables listed in Table 3.

Figure 24:
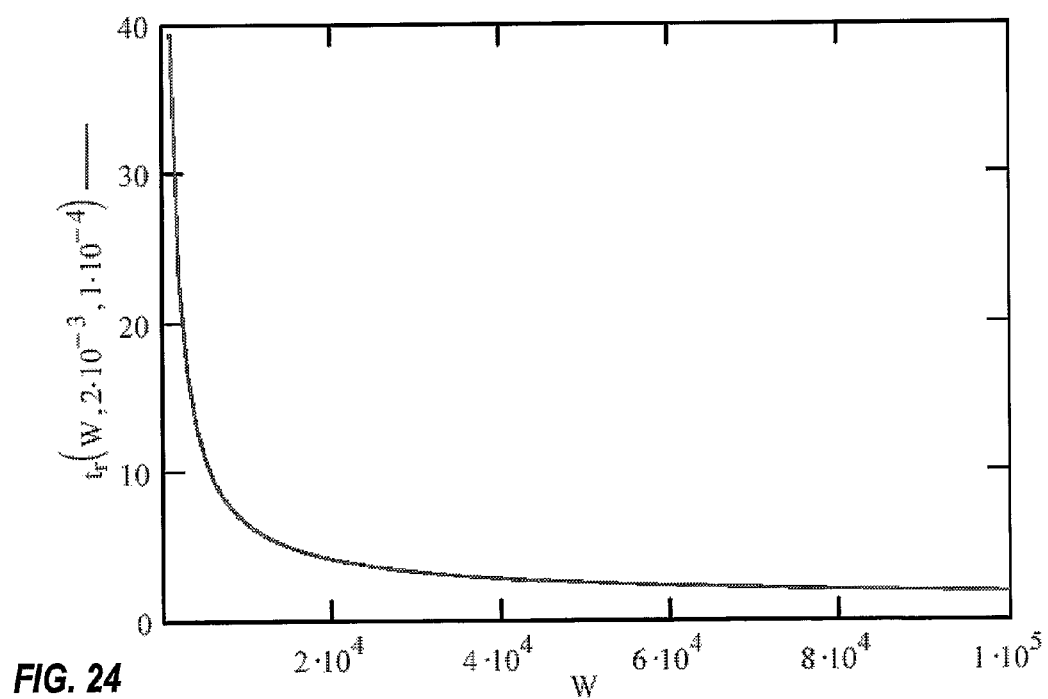
FIG. 24 illustrates dependence of refreezing time, $t_r$, on heating power density, W.
Figure 25:
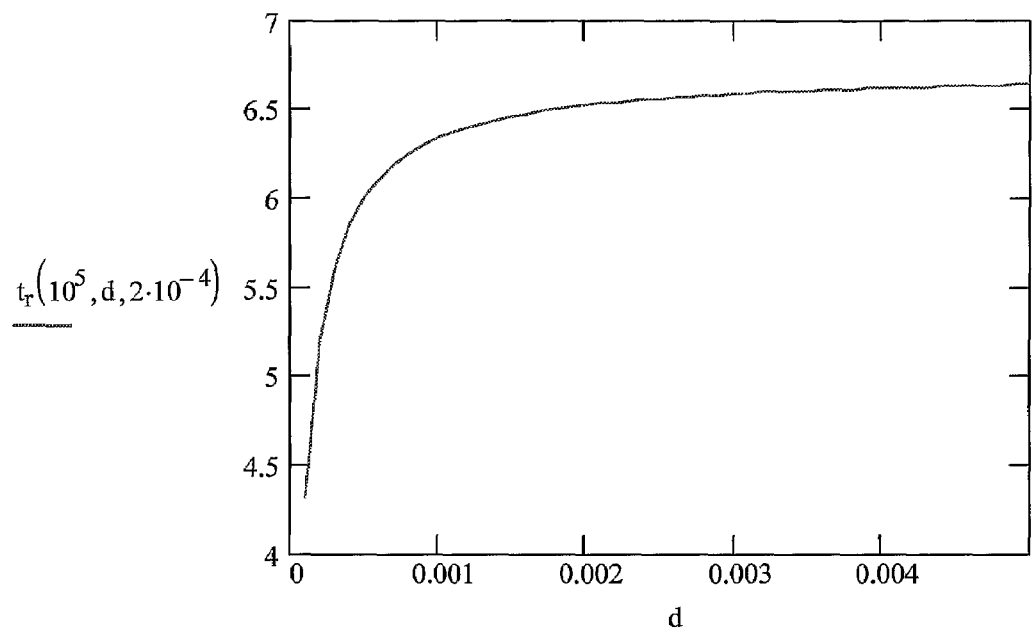
FIG. 25 illustrates dependence of the refreezing time, $t_r$, on dielectric thickness, d.
Figure 26:
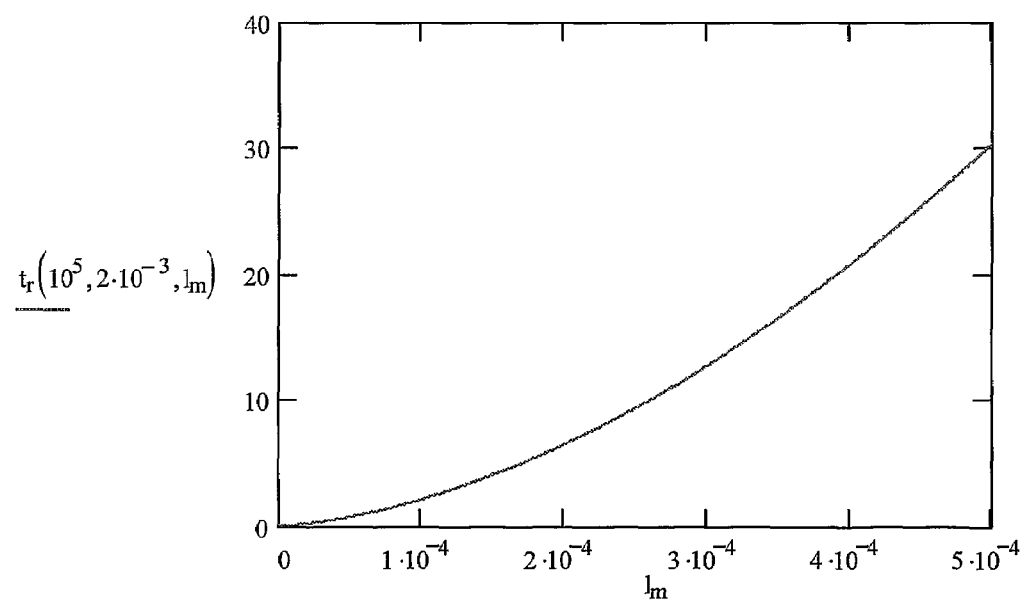
FIG. 26 illustrates dependence of refreezing time, $t_r$, on thickness of melted layer $l_m$.

FIG. 24 illustrates dependence of refreezing time, $t_r$, on heating power density, W. Given the values of the constants used in Example 2, $t_r$ decreases as W increases (e.g., since higher W reduces Q for a given melted layer thickness $l_m$, as seen from FIG. 21; higher W also reduces refreezing time) but $t_r$ remains greater than 2s for values of W up to about 10⁵ watts. FIG. 25 illustrates dependence of the refreezing time, $t_r$, on dielectric thickness, d. Given the values of the constants used in Example 1, $t_r$ increases as d increases. FIG. 26 illustrates dependence of refreezing time, $t_r$, on thickness of melted layer $l_m$. Given the values of the constants used in Example 2, $t_r$ increases as $l_m$ increases.

One set of parameters that may be chosen as optimized parameters for Example 2 are:

| Item | Symbol | Value |
|---|---|---|
| Air gap width: | d | 2 mm |
| Thickness of melted ice layer: | $l_m$ | 0.2 mm |
| Heating-pulse duration: | t | 1.08 s |
| Heating pulse energy per m² of foil 18(2) | Q/S | 108 kJ/m² |
| Average energy consumed by the ice releasing mechanism per square meter of the heater foil, when a heating pulse is applied every 30 minutes. | Q/1800S | 60 watt/m² |
| Density of power during a heating pulse: | W/S | 100 kW/m² |
| Time before refreezing of the melted layer | $t_r$ | 1.999 s |

Comparison of expected performance for system 10(1) (using dielectric film 16(1)) and system 10(4) (using an air gap) shows that system 10(4) consumes the same amount of energy during an ice releasing process, but provides more time for ice to slide off the cold plate before it refreezes. Nevertheless, both systems 10(1) and 10(4) consume less average electric power during the ice releasing process than conventional ice-makers. For instance, if systems like those shown in FIG. 1 through FIG. 4 (with 2.5 cm thick ice and a 2.5 cm thick aluminum cold plate) were heated slowly to the ice melting point, the minimum energy needed to heat the cold plates and ice interface to produce the same amount of ice melting would be $$1160 \frac{\text{watt}}{\text{m}^2},$$

versus the $$60 \frac{\text{watt}}{\text{m}^2}$$

used by systems 10(1) and 10(4). Thus, in releasing ice, systems 10(1) and 10(4) may be about 20 times more economical than the prior art.

An experimental prototype of an ice-maker of a design depicted in FIG. 3 and FIG. 4 was built. Testing showed nearly instant ice release when a heating pulse was applied. Other experimentally-observed characteristics were very close to those shown in Example 1 above.

A conventional ice-maker typically must re-cool a cold plate after harvesting the ice, thus using even more energy per cycle, but in systems 10(1) through 10(6), ice growth can restart on the order of seconds after ice harvesting because cold plates 12(1)-12(6) remain cold during the harvesting.

Heat Exchangers Utilizing PETD

Heat exchangers serve to transfer heat between thermal masses. In one heat exchanger configuration, air circulates adjacent to heat exchanger surfaces that are cooled by a circulating coolant; the air gives up heat to the coolant. When temperature of the coolant is low enough, ice may form on the surfaces, impeding heat exchange between the surfaces and the air. It is desirable to remove such ice with a minimum of added heat, since a surface that is heated must be re-cooled in order to resume heat exchange with the air.

Figure 27:
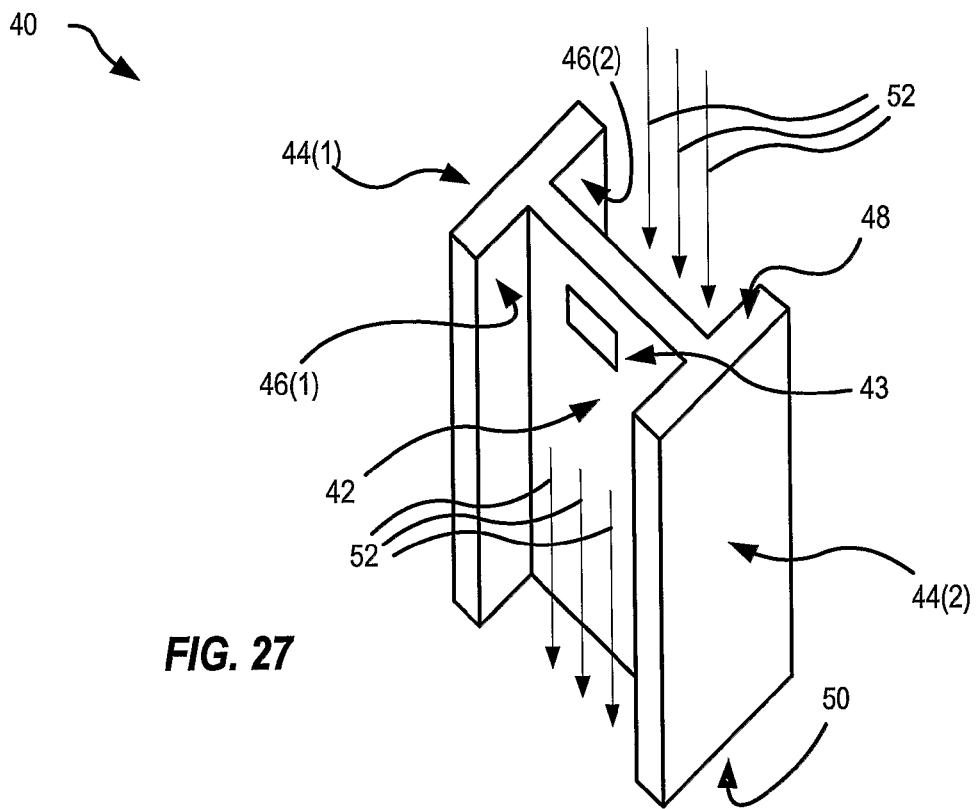
FIG. 27 shows, in perspective view, a heat exchanger configured as a pulse system for detaching ice.

FIG. 27 shows, in perspective view, a heat exchanger 40 configured as a pulse system for detaching ice. Heat exchanger 40 may be formed, for example, of metal or an electrically and thermally conductive polymer. Surfaces 44(1) and 44(2) are cooled by a circulating coolant. Air circulates in the direction of arrows 52 past cooling surfaces 42, 46(1) and 46(2), and corresponding cooling surfaces opposite surface 42 and surface 44(2) that are hidden in this view. Heat passes from the air to the cooling surfaces of the heat exchanger, then passes to the coolant; ice may form on the cooling surfaces. A thin-film ice detector 43 may attach to one or more of the cooling surfaces, for example, cooling surface 42, for detecting the presence of the ice and/or frost, and may measure the thickness of the ice or frost. A top surface 48 and a bottom surface 50 are thermally insulated so that ice does not form thereon.

Figure 28:
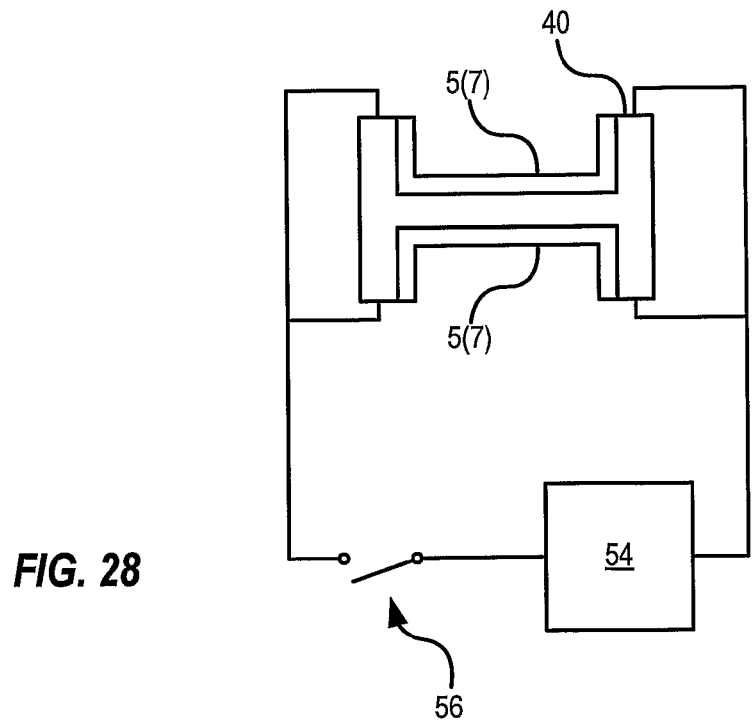
FIG. 28 shows a top view of the heat exchanger of FIG. 27 with accumulated ice and with connections to a power supply and a switch.

FIG. 28 shows a top view of heat exchanger 40 with accumulated ice 5(7) and with connections to a power supply 54 and a switch 56. In operation, heat exchanger 40 cools air and may accumulate ice 5(7). Switch 56 then closes, sending a heating pulse of electrical current through heat exchanger 40; the power and duration of the heating pulse can be controlled to melt an ice-object interface before significant heat from the pulse dissipates into ice 5(7) and the cooling surfaces of heat exchanger 40. If heat exchanger 40 is oriented vertically (e.g., as shown in FIGS. 27 and 28), gravity can cause ice 5(7) to slide off heat exchanger 40 after a heating pulse is applied.

Figure 29:
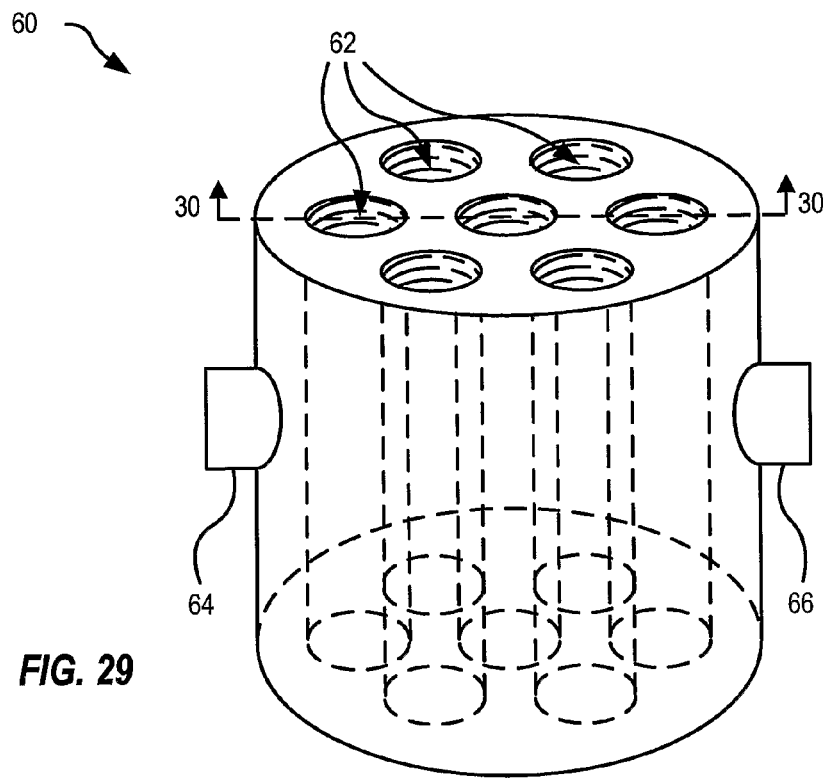
FIG. 29 shows a heat exchanger configured as a pulse system for detaching ice.

FIG. 29 shows a heat exchanger 60 configured as a pulse system for detaching ice. Heat exchanger 60 forms air channels 62 where heat passes from air to coolant that enters exchanger 60 at inlet 64 and exits exchanger 60 at outlet 66. Dashed line 30-30 indicates the top of a cross-sectional plane shown in FIG. 30.

Figure 30:
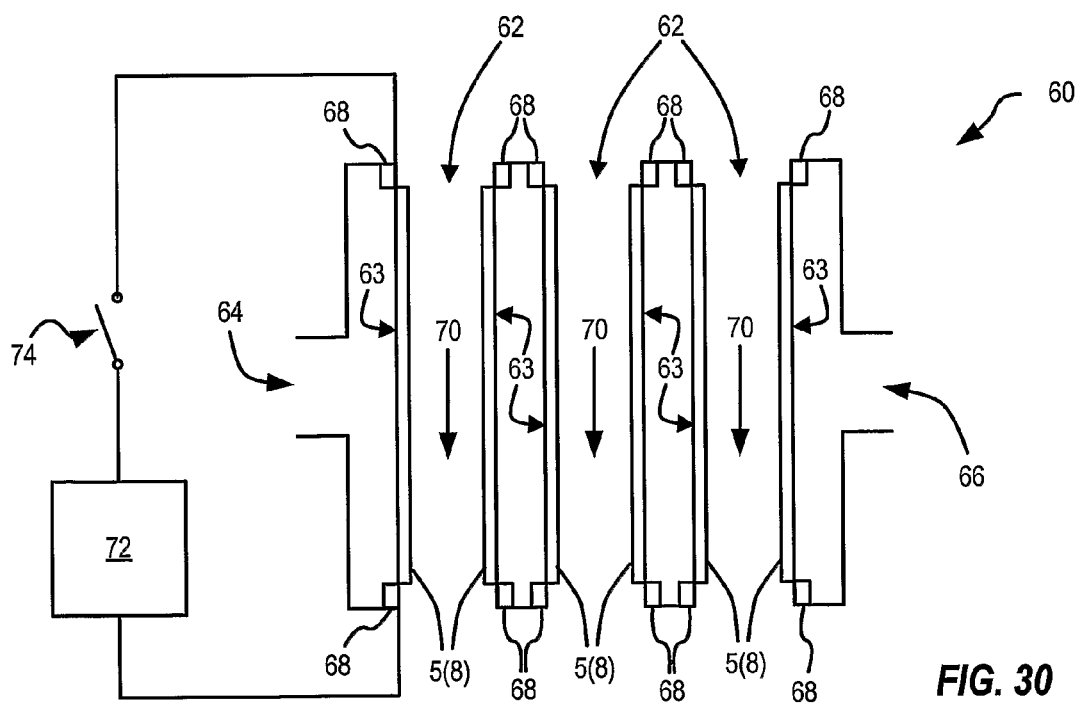
FIG. 30 shows a cross-sectional view of the heat exchanger of FIG. 29.

FIG. 30 shows a cross-sectional view of heat exchanger 60 taken from a plane extending vertically downward from dashed line 30-30 in FIG. 29. Air flows through heat exchanger 60 in the direction of arrows 64. Cooling surfaces 63 form the sides of air channels 62, and a layer of thermal insulation 68 insulates a top and a bottom of each air channel 62, as shown. Each cooling surface 63 connects with a power supply 72 through a switch 74 (only one cooling surface 63 is shown as connected, for clarity of illustration).

In operation, heat exchanger 60 cools air and may accumulate ice 5(8) on cooling surfaces 63. Switch 74 may then close, sending a heating pulse of electrical current through each of cooling surfaces 63; the power and duration of the heating pulse is controlled to melt an ice-object interface before significant heat from the pulse dissipates into ice 5(8) into coolant, and cooling surfaces 63. If heat exchanger 60 is oriented vertically (e.g., as shown in FIGS. 29 and 30), gravity can cause ice 5(8) to slide off cooling surfaces 63 after a heating pulse is applied.

It will be appreciated that modifications of heat exchangers 40 and 60 are within the scope of this disclosure. For example, cooling surfaces of heat exchanger 40 may be shaped differently from the shapes shown in FIG. 27 and FIG. 28; coolant may run through tubes or channels of heat exchanger 40. Instead of connecting cooling surfaces to power supplies, heating foils or films may be disposed on a dielectric layer adjacent to cooling surfaces of heat exchangers 40 or 60. Spaces may be sealed between a heating foil or film and a cooling surface, and the spaces may be alternately evacuated to bring the heating foil or film into thermal contact with the cooling surface, and pressurized to develop an air gap between the heating foil or film and the cooling surface during ice detachment. Cooling surfaces may form sections (as per the following discussion), such sections may form electrical connections to switches and power supplies such that not all sections receive a heating pulse at a given time.

Instant Pulse Power Versus Available Electric Power

In systems 10(1)-10(6), although an average power consumed by ice-releasing pulses is very low (e.g., 60 w/m$^2$, or, about 39 w for a 1000 inch$^2$ cold plate), power desired for a short heating pulse (e.g., 6.6 kw to 65 kw for a 1000 inch$^2$ cold plate) may be more than certain power supplies can continuously support (e.g., 2 kw to 3 kw). To match available power with a desired pulse-power, a heater foil (or film) may be "sectioned." When powered, an individual section does not overload power supply capacity; yet because deicing of each section obeys the same theory as in the case of deicing a whole grid, a total energy requirement remains the same. When ice is harvested in sections, total harvesting time is then equal to pulse duration times the number of sections. Energy storage devices, such as ultracapacitors, super-capacitors, electrolytic capacitors, and batteries may be used to accumulate electric energy between heating pulses, redistributing the energy as single pulses to facilitate ice harvesting of individual sections or an entire cold plate.

Pulse Electro-Evaporating Deicing

Although systems 10(1)-10(6) advantageously employ PETD to reduce energy consumption associated with ice harvesting, Pulse Electro-Evaporative Deicing ("PEED") can provide further reductions in energy consumption; PEED also has applications other than ice harvesting. In PEED systems, some or all of an ice-object interface is rapidly heated above the water boiling point. Such heating not only melts the interface, but also produces high pressure water vapor that pushes ice away from the object. The very short heating time limits heat diffusion in the ice and substrate, thus reducing total energy requirements. Certain configurations of ice collecting surfaces and heaters may concentrate heat required to vaporize ice in a small volume, reducing the energy used for detaching ice. Theoretical calculations and experimental results show that systems utilizing PEED may consume even less energy than systems utilizing PETD, despite the PEED systems reaching a higher operating temperature than the PETD systems.

Figure 31:
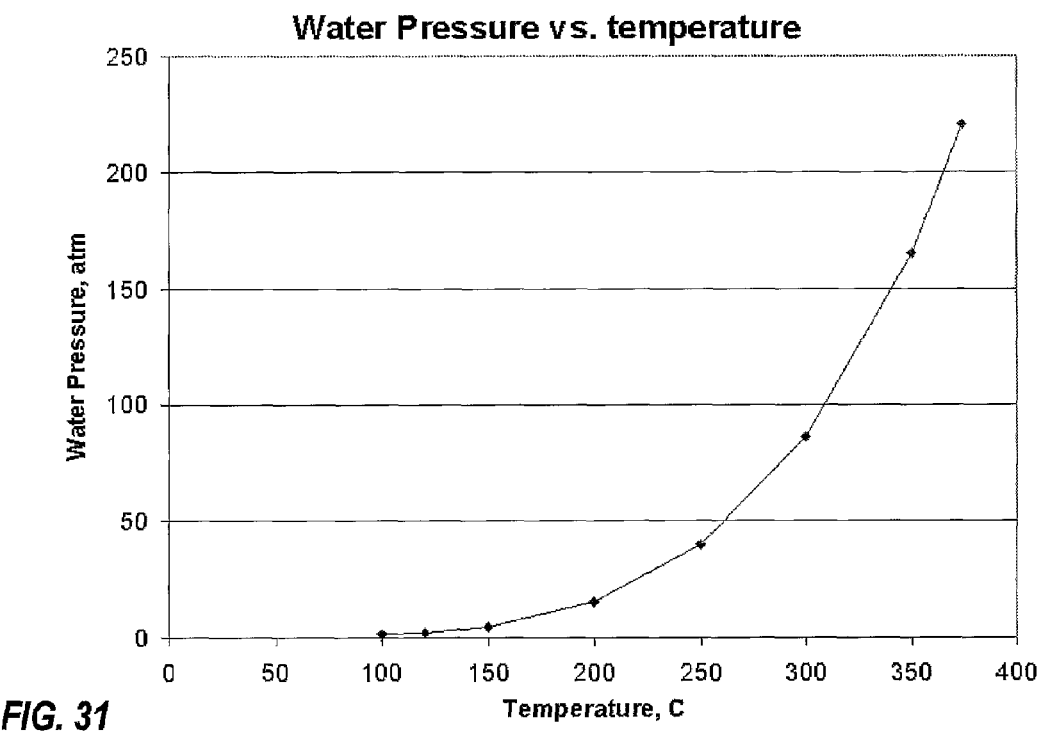
FIG. 31 shows dependence of the equilibrium pressure of water vapor on temperature.

FIG. 31 shows dependence of the equilibrium pressure of water vapor on temperature, showing that even moderate overheating of water above 100° C. results in very high water vapor pressure. For instance, at T=120° C., P=2 atm, pressure of 2 atm pushing on 1 cm thick ice accelerates the ice at a rate of: $a \approx 10^4$ M/s$^2$.

A theory of PEED now follows. PEED utilizes a substrate and a thin heating element. Ice grows over the heating element, with the entire system at an ambient temperature below the freezing point of water. A heating pulse of electric current applied to the heating element heats an ice-object interface (e.g., where the metal heater meets the ice) to above the boiling point of water such that vaporized water pushes the remaining ice away from the heating element. The heating pulse may be of sufficiently short duration that significant heat does not diffuse into the substrate and/or the remaining ice.

Figure 32A:
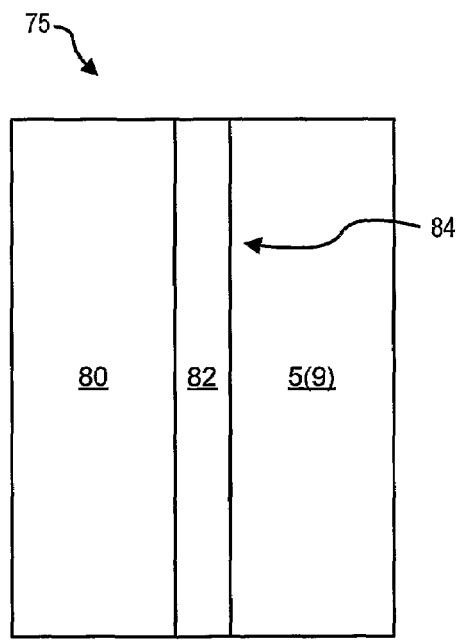
FIG. 32A shows schematically a pulse deicing system.
Figure 32B:
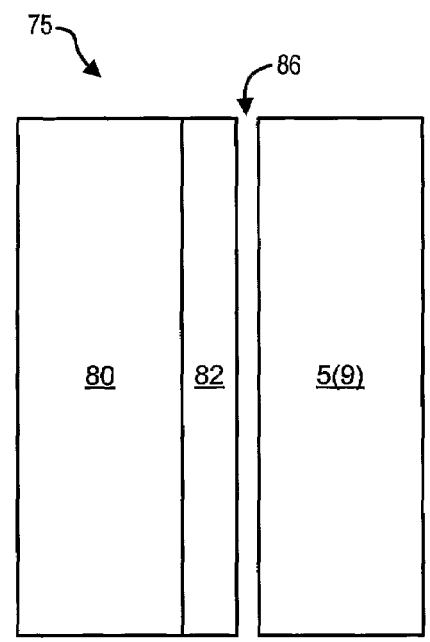
FIG. 32B shows the pulse deicing system of FIG. 32A after a heating pulse has been applied to a heating element.

FIG. 32A shows schematically a pulse deicing system 75. System 75 includes a substrate 80 and a heating element 82, and is shown with ice 5(9) that forms an ice-object interface 84 at heating element 82. FIG. 32B shows pulse deicing system 75 after a heating pulse has been applied to heating element 82. Pressure from water vapor created at ice-object interface 84 of FIG. 32A creates a space 86 between heating element 82 and ice 5(9).

A PEED heating element (e.g., heating element 80) may be made of metal foil, metal mesh, thin metal film, ITO film, semiconductor film, carbon-fiber mesh, carbon nanotube mesh, carbon fiber, carbon-nanotube conductive composite, porous conductive foil, or conductive paint. Thickness of a PEED heating element may be in a range of from about 10 nm to about 1 mm. A heating pulse of electric current may have a duration of from about 1 μs to about 100 s, typically from 1 ms to 1 s. A density of heating power may be from about 10 kW/m$^2$ to about 10 MW/m$^2$, typically from 100 kW/m$^2$ to 1 MW/m$^2$.

EXAMPLE 3

Figure 33:
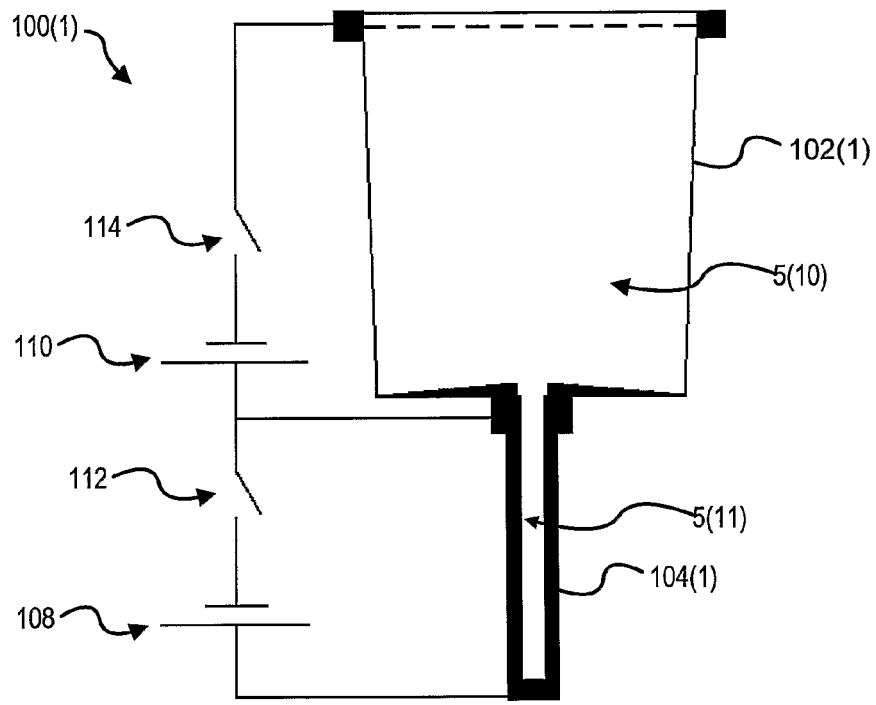
FIG. 33 shows a cross section of one ice-making system that utilizes both PETD and pulse electro-evaporative deicing ("PEED").

FIG. 33 shows a cross section of one ice-making system 100(1) that utilizes both PETD and PEED. Ice-making system 100(1) has an ice-container 102(1) and a capillary 104(1) that may both be made, for example, of stainless steel. Container 102(1) and capillary 104(1) are filled with water that freezes to form a main ice portion 5(10) and a capillary ice portion 5(11). Container 102(1) may be shaped like a frustum.

Ice-making system 100(1) is powered by two power sources 108, 110 switched by two switches 112, 114, respectively. When ice is harvested from ice-making system 100(1), switch 114 first closes, supplying a first heating pulse to ice container 102(1), then switch 112 closes, supplying a second heating pulse to capillary 104(1). The first heating pulse has sufficient energy to melt at least an interfacial ice layer between container 102(1) and ice portion 5(10); the second heating pulse has sufficient energy to evaporate part or all of capillary ice portion 5(11). Pressure caused by vaporization of part or all of capillary ice portion 5(11) ejects ice portion 5(10) from ice container 102(1). Both the first and the second heating pulse may be of sufficiently short duration that significant heat does not diffuse into ice portion 5(10) before it is ejected from ice container 120(1). Each of power sources 112 and 114 may be configured so as to provide a suitable heating energy to capillary 104(1) and ice container 102(1), so that heat provided to ice container 102(1) is sufficient to melt the interfacial ice layer without significantly exceeding the required heat, and so that heat provided to capillary 104(1) is sufficient to expel ice portion 5(10) without significantly exceeding the required heat.

Figure 34:
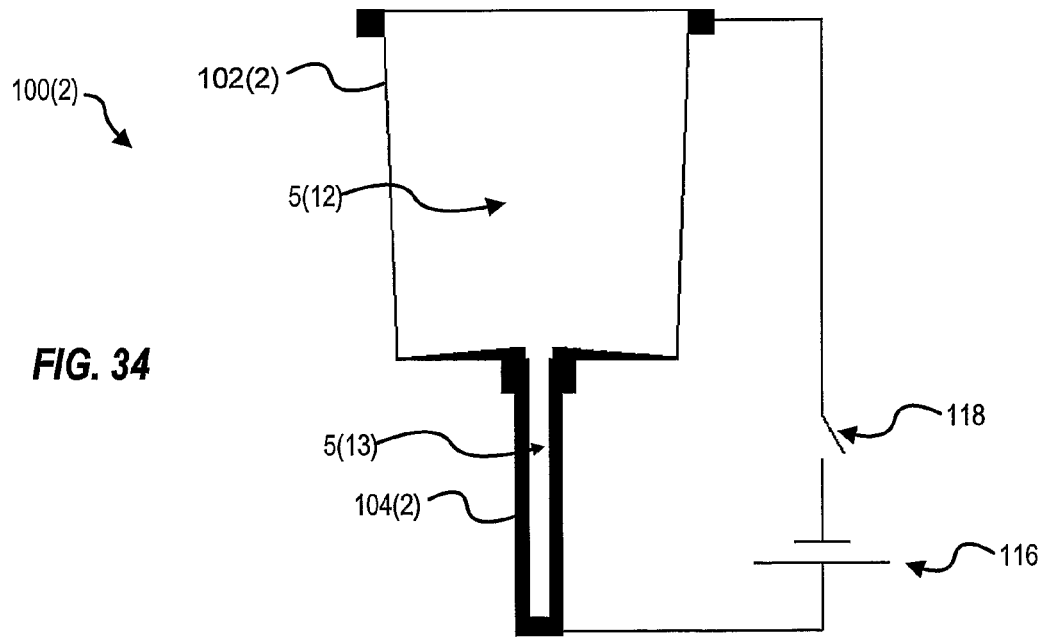
FIG. 34 shows a cross section of one ice-making system that utilizes both PETD and PEED.

FIG. 34 shows a cross section of one ice-making system 100(2) that utilizes both PETD and PEED. Ice-making system 100(2) has an ice-container 102(2) and a capillary 104(2) that may both be made, for example, of stainless steel. Ice-making system 100(2) is powered by a power source 116 switched by a switch 118. When switch 118 closes, a single heating pulse melts interfacial ice between ice container 102(2) and ice portion 5(12), and evaporates part or all of ice portion 5(13) inside capillary 104(4). Pressure caused by vaporization of part or all of capillary ice portion 5(13) ejects ice portion 5(12) from ice container 102(2). The heating pulse may be of sufficiently short duration, and electrical resistances of ice container 102(2) and capillary 104(2) may be balanced such that significant heat does not diffuse into ice portion 5(12) before it is ejected from ice container 120(2).

Power sources 108, 110 and/or 116 may be regular AC power outlets, DC power supplies such as a battery, a capacitor or an ultracapacitor. Switches 112, 114 and 118 may be semiconductor type switches (power-MOSFETs, IGBTs, thyristors, etc.), mechanical switches, electromagnetic switches, or any combination of the above. Electronic logic circuits may be used to control the relative duration and timing of heating pulses (e.g., to close switch 114 for a specific duration, wait for a specific delay time, then close switch 112 for a specific duration).

Ice-making systems according to the description of system 100(1) were built and tested. The ice container was made of 0.1-mm stainless steel and was frustum shaped with a top diameter of 23.9 mm. The container length was 25.4 mm. The stainless steel capillary tube was 17-cm long with an inner diameter of 1.4 mm and an outer diameter of 2.4 mm. In one case, a 0.95 second, 229-Joule pulse of current was first applied to the ice container (e.g., using power source 110 and switch 114); 0.2 second later, a 0.125-second, 859-Joule pulse was applied (e.g., using power source 108 and switch 112) to evaporate ice inside the capillary. The main ice portion was ejected from the ice container. In another case, a single switch (e.g., switch 118) was used to supply a single heating pulse to the ice container and capillary; the main ice portion was again ejected.

Figure 35:
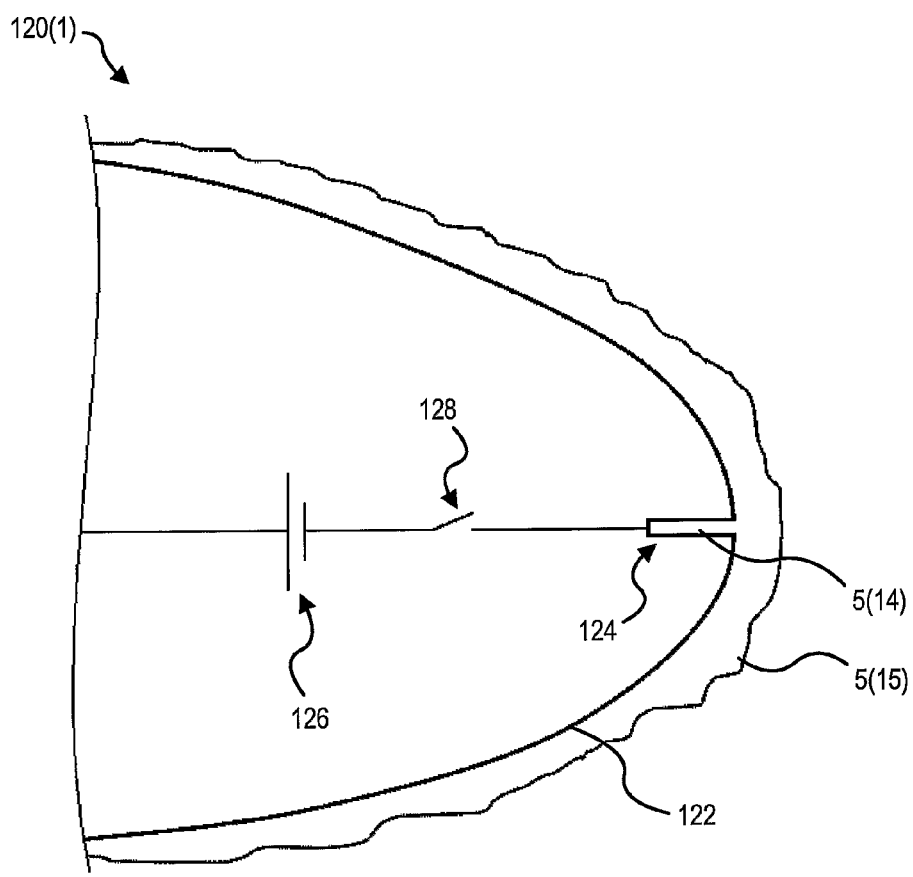
FIG. 35 shows a pulse deicing system that utilizes both PETD and PEED to deice a leading edge of an aircraft wing.

FIG. 35 shows a pulse deicing system 120(1) that utilizes both PETD and PEED to deice a leading edge of an aircraft wing 122. System 120(1) includes a power supply 126, a switch 128 and capillaries 124 (only one capillary 124 is shown in this view). Operation of an aircraft may cause ice 5(14) to form within capillary 124, and ice 5(15) to build up on wing 122. System 120(1) can deice wing 122 by closing switch 128 so that a heating pulse of electrical current flows from power supply 126 through sides of capillary 124 and through wing 122; the heating pulse melts an ice-object interface formed between wing 122 and ice 5(15), and vaporizes at least part of ice 5(14). Vapor pressure from the vaporized ice breaks up ice 5(15) so that it can slide off of wing 122 before refreezing.

Figure 36:
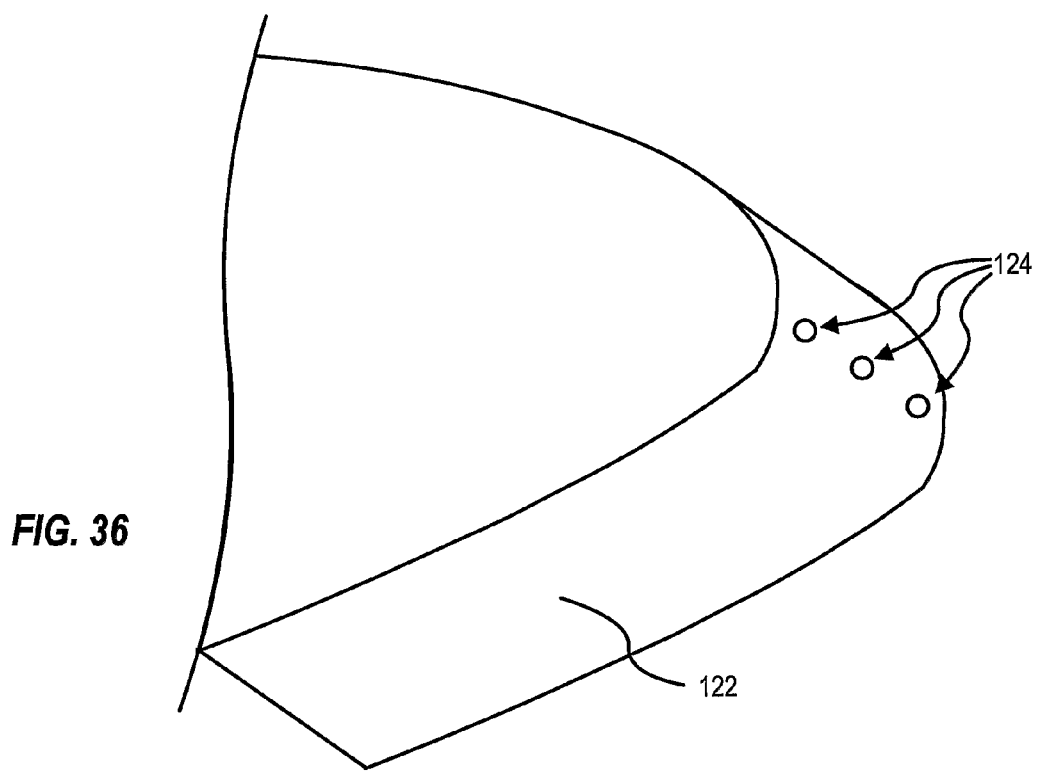
FIG. 36 shows a perspective view of a part of the aircraft wing of FIG. 35.

FIG. 36 shows a perspective view of a part of aircraft wing 122. A line of capillaries 124 is present on a stagnation line of wing 122. Spacing between adjacent capillaries 124 may be optimized so that when all capillaries 124 simultaneously receive a heating pulse, ice 5(15) breaks up along an entire length of wing 122.

Like ice-making system 100(2), the relative electrical resistances of capillary 124 and wing 122, and the power and duration of the heating pulse supplied by power supply 126 and switch 128, may be optimized to melt an ice-object interface and break up ice with minimal wasted energy. Alternatively, one switch and power supply may be utilized to melt an ice-object interface between ice 5(15) and wing 122, and a second switch and power supply may be utilized to evaporate ice in one or more capillaries 124 (e.g., as ice-making system 100(1) utilizes two power supplies and switches while ice-making system 100(2) utilizes only one power supply and switch). Additionally, capillaries and wing 122 may be divided into sections such that only one section is deiced at a time, in order to utilize a lower-capacity power supply 126. Metal of wing 122 may be utilized as a heating element, or a separate heating element may be utilized. For example, a separate heating element may be affixed to an aircraft wing with or without an underlying dielectric layer (e.g., if the conductivity of an aircraft wing is too high or too low to serve effectively as an heating element).

In even another embodiment, an array of small capillaries are replaced with a strip of porous metal foil. The porous foil saturates with water from air, so the pores are filled with water. When a heating pulse of electric current is applied to the porous foil, the current heats the foil above the water boiling point producing high-pressure water vapor between the ice and the wing.

EXAMPLE 4

Figure 37A:
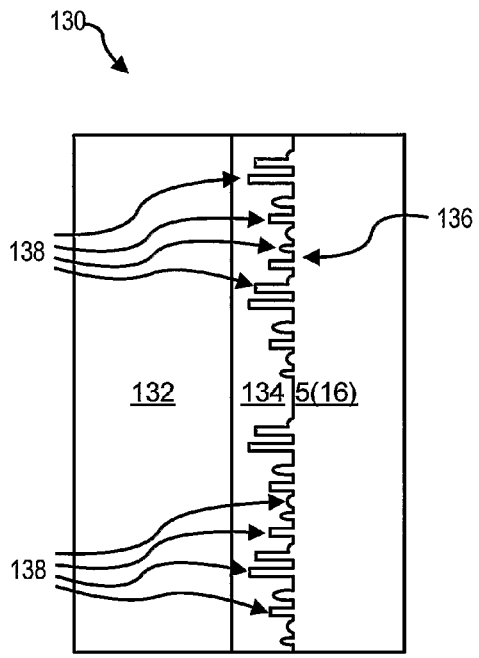
FIG. 37A shows schematically a pulse electro-evaporative deicing system.
Figure 37B:
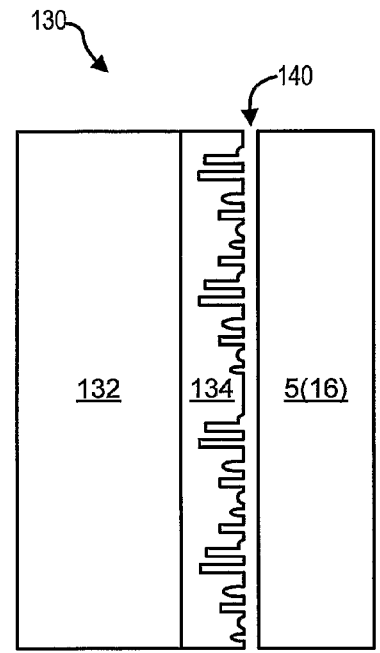
FIG. 37B shows the pulse deicing system of FIG. 37A after a heating pulse has been applied to a heating element.

FIG. 37A schematically shows a pulse electro-evaporative deicing system 130. System 130 includes a substrate 132 and a heating element 134, and is shown with ice 5(16) that forms an ice-object interface 136 at heating element 134. Heating element 134 has pores 138 that fill with ice 5(16). FIG. 37B shows pulse deicing system 130 after a heating pulse has been applied to heating element 134. Pressure from water vapor created at ice-object interface 136 of FIG. 37A, and in particular from water evaporated within pores 138, creates a space 140 between heating element 134 and ice 5(16).

A pulse deicing system according to the description of system 130 was built and tested. A porous stainless steel foil 0.32 mm thick was sintered of 53 μm to 75 μm particles; the foil had pores of about 10 μm. Water was placed on the foil and then frozen at T=−10° C., with part of the water penetrating and freezing in the pores of the foil. A 20 ms pulse of heating density $1.7 \times 10^7$ W/m² was applied. The ice inside the pores evaporated and pushed the ice sheet from the foil.

Deicing of Heat Exchange Fins with Heating Electric Pulses

Figure 38:
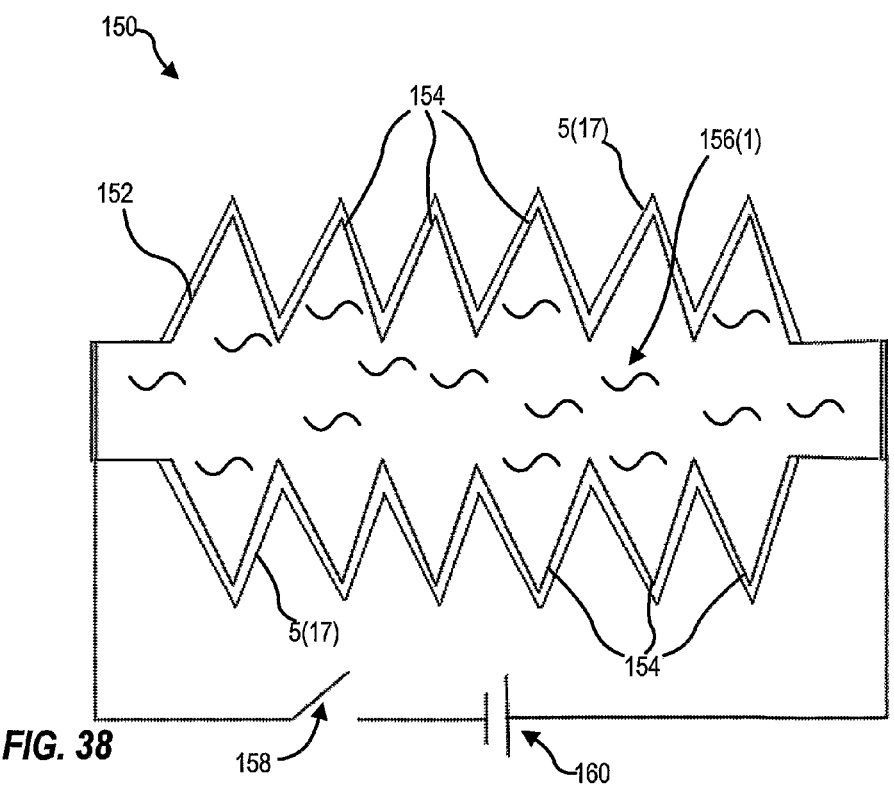
FIG. 38 shows an accordion-type heat exchanger configured as a pulse system for detaching ice.

FIG. 38 shows an accordion-type heat exchanger 150 configured as a pulse system for detaching ice. In heat exchanger 150, coolant 156 (Freon, or other liquid) flows through a coolant duct 152 having cooling fins 154 that form heat exchanging surfaces, exchanging heat with surrounding air. Although coolant duct 152 is shown as having coolant within fins 154, certain embodiments may have a coolant duct that has heat exchanging surfaces extending laterally from a straight tube or pipe (see, for example, FIG. 40); in other embodiments, a tube or pipe may assume a serpentine or zigzag shape to form heat exchanging surfaces (see, for example, FIG. 42). Ice 5(17) that may form on cooling fins 154 can be removed through pulse deicing. A power supply 160 sends a heating pulse of electric current through heat exchanger 150 when a switch 158 closes; the heating pulse melts at least an ice-object interface formed between fins 154 and ice 5(17); the heating pulse may also melt all of ice 5(17). A typical density of heating per unit area may be from about 5 KW/m2 to about 100 KW/m². Current magnitude and pulse duration may be adjusted based on a temperature, flow rate and coolant properties (e.g., density, heat capacity and thermal conductivity). A typical pulse duration may be from about 0.1 s to 10 s. Power supply 160 may be a regular AC power outlet, or a DC power supply such as a battery, a capacitor or an ultracapacitor. Switch 158 may be a semiconductor type (power-MOSFET, IGBT, thyristor etc.), a mechanical switch, an electromagnetic switch, or any combination of the above. Solid ice 5(17) remaining after the heating pulse may then be removed by gravity (e.g., ice 5(17) may slide off of fins 154) or by mechanical action such as scraping, shaking or air blowing against heat exchanger 150. Shaking can be provided by a small electric motor and a crankshaft, by an electromagnetic vibrator, or by inducing pressure oscillations into coolant 156, for example.

Figure 39:
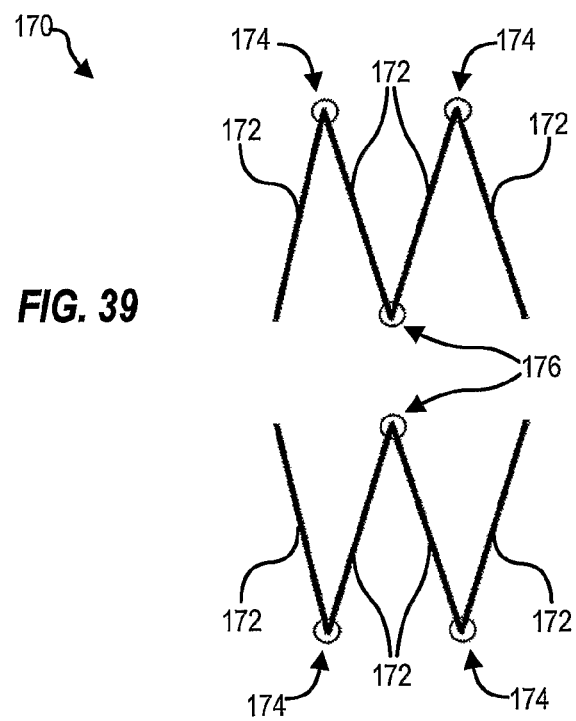
FIG. 39 shows a cross-sectional view of foil washers attached to form a coolant duct.

FIG. 39 shows a cross-sectional view of foil washers 172 attached to form a coolant duct 170. Coolant duct 170 may be used, for example, as coolant duct 152 (see FIG. 38). Foil washers 172 may be, for example, 4 mil stainless steel foil washers having inner diameters of 1 inch and outer diameters of 3 inches, and are either soldered or spot-welded at their outer edges 174 and their inner edges 176. Each washer 172 thus forms a heat exchanging surface (e.g., a pair of washers forms one cooling fin 154, FIG. 38).

Figure 40:
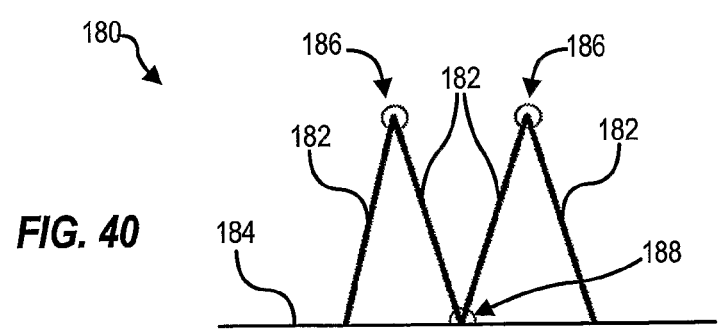
FIG. 40 shows a cross-sectional view of foil washers attached to a straight pipe to form a coolant duct.

FIG. 40 shows a cross-sectional view of foil washers 182 attached to a straight pipe 184 to form a coolant duct 180. Coolant duct 180 may be used, for example, as coolant duct 152 (see FIG. 38). Foil washers 182 may be, for example, 4 mil stainless steel foil washers having inner diameters of 1 inch and outer diameters of 3 inches, and are either soldered or spot-welded at their outer edges 186 and their inner edges 188; washers 182 may also be soldered or welded to pipe 184. Each pair of washers 182 thus forms a cooling fin (e.g., cooling fin 154, FIG. 38). Relative wall thicknesses of pipe 184 and washers 182 may be chosen so that they have similar density of heating power, W, when a pulse of a current is induced as shown in FIG. 38.

Figure 41:
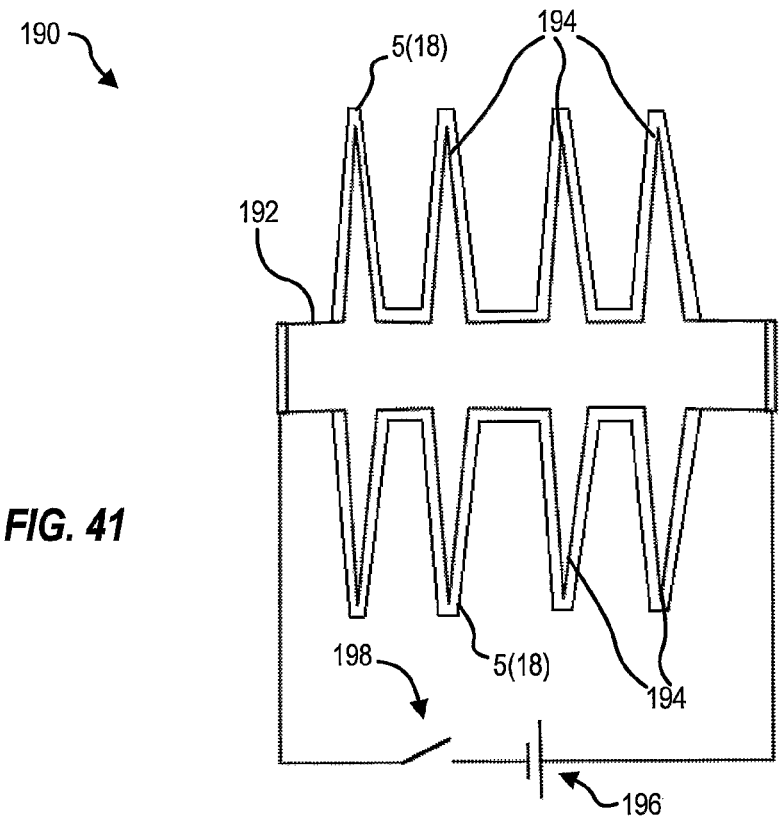
FIG. 41 shows another accordion-type heat exchanger configured as a pulse system for detaching ice.

FIG. 41 shows another accordion-type heat exchanger 190 configured as a pulse system for detaching ice. Heat exchanger 190 has a coolant duct 192 with cooling fins 194 that exchange heat with surrounding air. Ice 5(18) that may form on cooling fins 194 can be removed through pulse deicing. PETD deicing of heat exchanger 190 works in the same manner as for heat exchanger 170: power supply 196 sends a heating pulse of electric current through heat exchanger 190 when a switch 198 closes; the heating pulse melts at least an ice-object interface formed between fins 194 and ice 5(18); the heating pulse may also melt all of ice 5(18).

Figure 42:
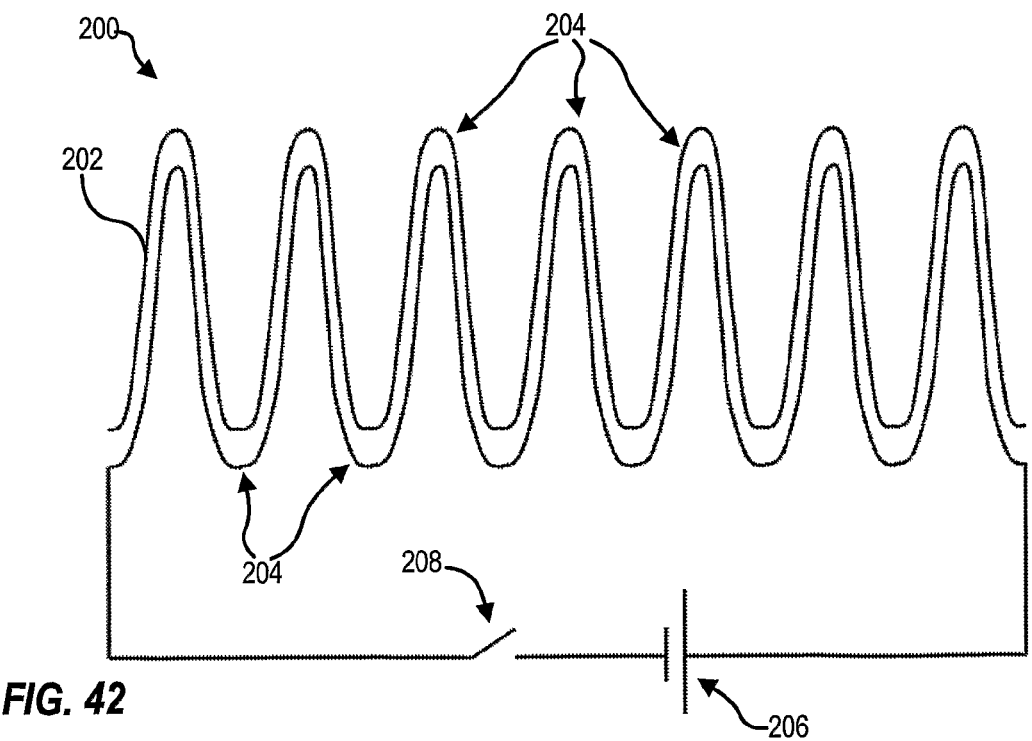
FIG. 42 shows another accordion-type heat exchanger configured as a pulse system for detaching ice.

FIG. 42 shows another accordion-type heat exchanger 200 configured as a pulse system for detaching ice. Heat exchanger 200 has a coolant duct 202 that exchanges heat with surrounding air; coolant duct 202 is of a serpentine type, with coolant flowing through bends 204 of coolant duct 202 to maximize heat exchanging surface area. Ice (not shown) that may form on coolant duct 202 can be removed through PETD deicing. A power supply 206 sends a heating pulse of electric current through heat exchanger 200 when a switch 208 closes; the heating pulse melts at least an ice-object interface formed between fins 204 and ice; the heating pulse may also melt all of the ice.

It will be appreciated that modifications of heat exchangers 150, 190 and 200 are within the scope of this disclosure. For example, heat exchanging surfaces of heat exchangers 150, 190 and 200 may be shaped differently from the shapes shown in FIG. 38, FIG. 41 and FIG. 42. Instead of ducts and/or cooling fins being connected with power supplies, heating foils or films may be disposed on a dielectric layer adjacent to such surfaces. Spaces may be sealed between a heating foil or film and heat exchanging surface, and the spaces may be alternately evacuated to bring the heating foil or film into thermal contact with the cooling surface, and pressurized to develop an air gap between the heating foil or film and the cooling surface during ice detachment. Heat exchanging surfaces may form sections such as discussed above; sections may form electrical connections to switches and power supplies such that not all sections receive a heating pulse at a given time.

Pulse-heating of thin-wall metal tubes and foils may advantageously utilize low voltage (1 V to 24 V) but high current (hundreds or thousands of amperes). When direct use of higher voltage (e.g., 120 VAC or 240 VAC) is preferable, higher electrical resistance is advantageous. Higher resistance can be achieved by separating a heater conductive film from a cooling duct. For instance, a heat exchanger with fins may be made of anodized aluminum, with a thin, highly resistive heating film applied on top of the (insulating) anodized layer. The heating film can be applied by CVD, PVD, electrolysis coating, or by painting.

Figure 43:
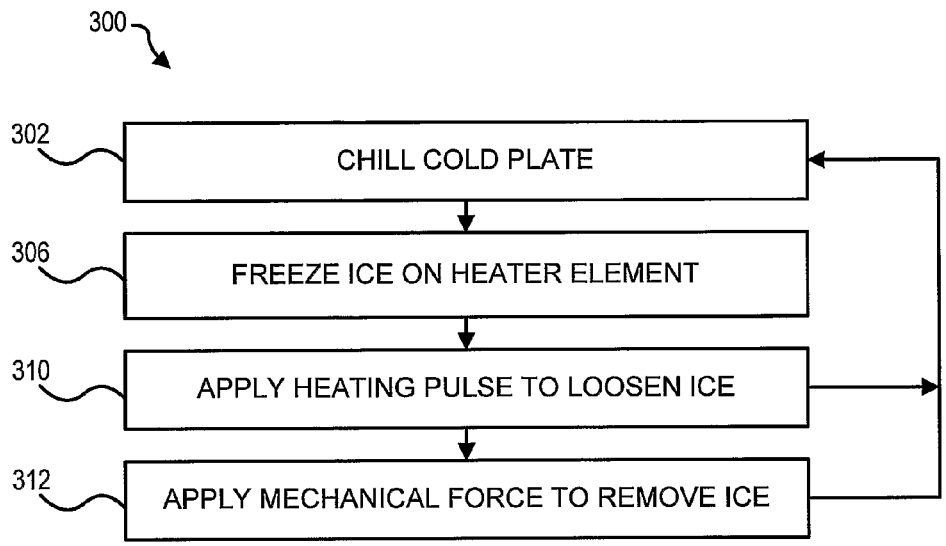
FIG. 43 shows a method of making ice utilizing pulse deicing.

FIG. 43 shows a method 300 of making ice utilizing pulse deicing. Method 300 may be performed, for example, by any of ice-making systems 10(1) through 10(3), described above, such as through control and operation of microprocessors associated with the systems. Step 302 of method 300 chills a cold plate (e.g., any of cold plates 12(1)-12(3)). Step 306 freezes ice on a heater element (e.g., any of foils 18(1)-18(3)). Step 310 applies a heating pulse to loosen the ice. Method 300 may revert to step 302 after step 306 if step 306 results in the ice being at a desired location (e.g., because the ice drops into a receptacle); alternatively, method 300 may continue to step 312 which applies mechanical force to remove the ice (e.g., scrapes the ice, picks it up, applies an air blow to move it, etc.). Step 312 may for example be performed by an electromechanical device (blower, scraper) under control of the microprocessors in the systems. When the ice is at a desired location, method 300 reverts to step 302 to begin again.

Figure 44:
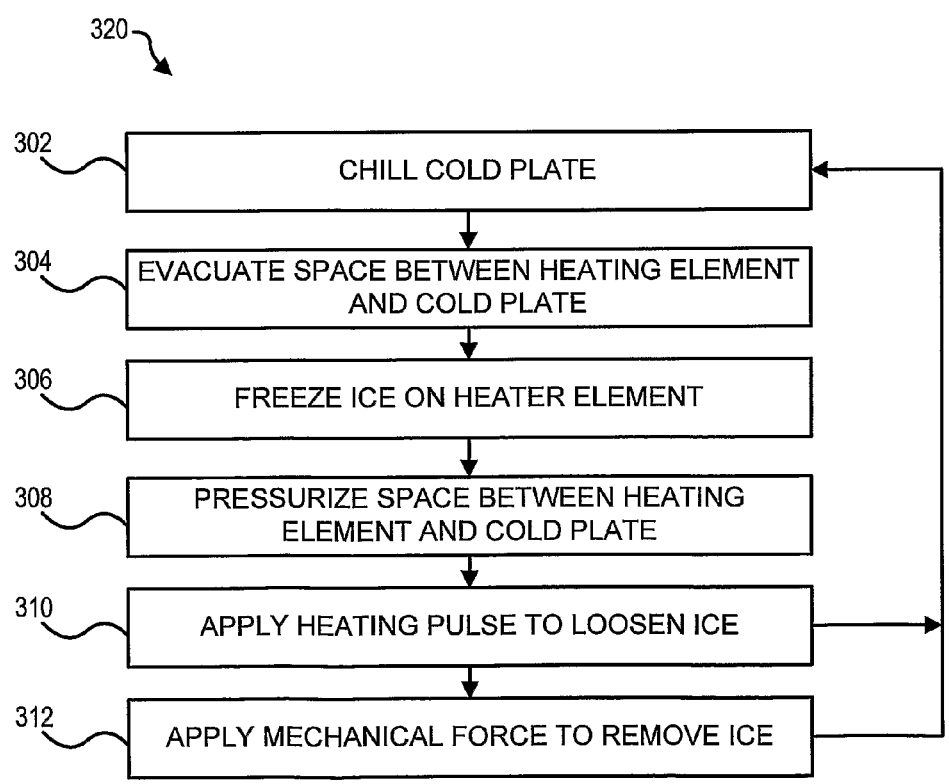
FIG. 44 shows a method of making ice utilizing pulse deicing.

FIG. 44 shows a method 320 of making ice utilizing pulse deicing. Method 320 may be performed, for example, by any of ice-making systems 10(4) through 10(6), described above, such as through control and operation of microprocessors (and, if desired, mechanical actuators) associated with the systems. Step 302 of method 320 chills a cold plate (e.g., any of cold plates 12(4)-12(6)). Step 304 evacuates a space (e.g., any of spaces 15(1) through 15(3)) between the cold plate and a heater element (e.g., any of foils 18(4)-18(6)) so that the cold plate and the heater element are in thermal contact. Step 306 freezes ice on the heater element. Step 308 pressurizes the space to generate an air gap between the heater element and the cold plate. Step 310 applies a heating pulse to loosen the ice. Method 320 may revert to step 302 at this point if step 306 results in the ice being at a desired location (e.g., because it drops into an ice receptacle); alternatively, method 320 may continue to step 312 which applies mechanical force to remove the ice (e.g., scrapes the ice, picks it up, applies an air blow to move it, etc.). When the ice is at a desired location, method 320 reverts to step 302 to begin again.

Figure 45:
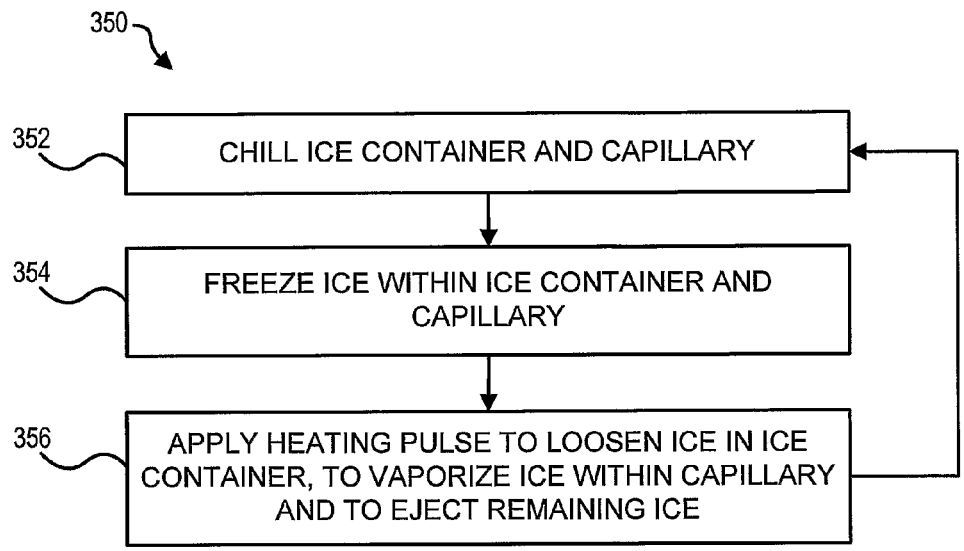
FIG. 45 shows a method of making ice utilizing pulse electro-evaporative deicing.

FIG. 45 shows a method 350 of making ice utilizing pulse electro-evaporative deicing. Method 350 may be performed, for example, by ice-making system 100(2), described above, such as through control and operation of microprocessors (and, as appropriate, electromechanical devices such as blowers and scrapers) associated with the systems. Step 352 of method 350 chills an ice container and a capillary (e.g., ice container 102(2) and capillary 104(2)). Step 354 freezes ice within the ice container and the capillary. Step 356 applies a heating pulse (e.g., by closing switch 118) to loosen the ice and to vaporize ice within the capillary, thereby ejecting the ice. After step 356, method 350 reverts to step 352 to begin again.

Figure 46:
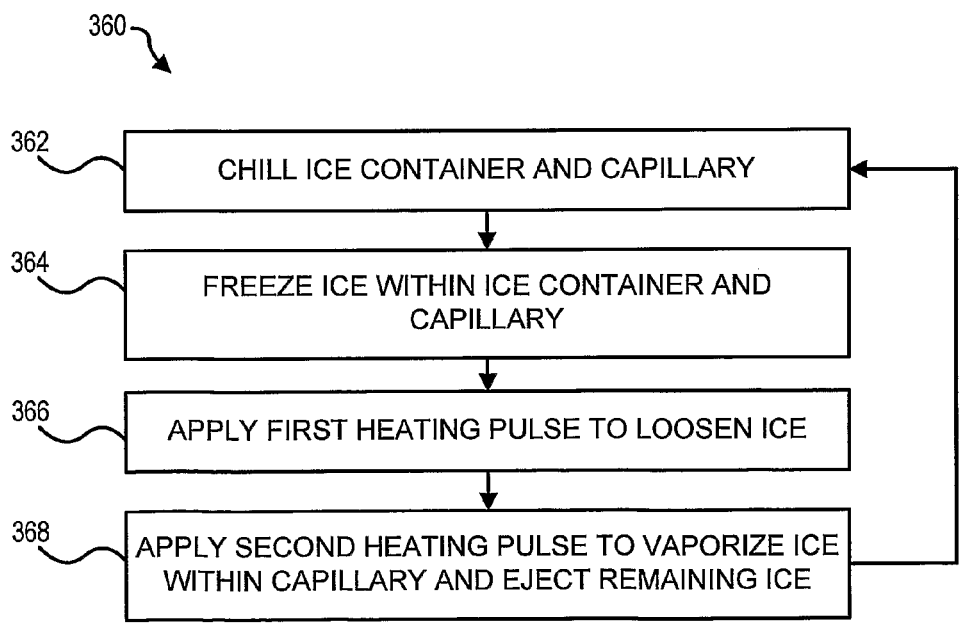
FIG. 46 shows a method of making ice utilizing pulse electro-evaporative deicing.

FIG. 46 shows a method 360 of making ice utilizing pulse electro-evaporative deicing. Method 360 may be performed, for example, by ice-making system 100(1), described above, such as through control and operation of microprocessors (and, as appropriate, electromechanical devices such as blowers and scrapers) associated with the systems. Step 362 of method 360 chills an ice container and a capillary (e.g., ice container 102(1) and capillary 104(1)). Step 364 freezes ice within the ice container and the capillary. Step 366 applies a first heating pulse (e.g., by closing switch 114) to loosen the ice within the ice container. Step 368 applies a second heating pulse (e.g., by closing switch 112) to vaporize ice within the capillary, thereby ejecting the ice. After step 368, method 360 reverts to step 362 to begin again.

Figure 47:
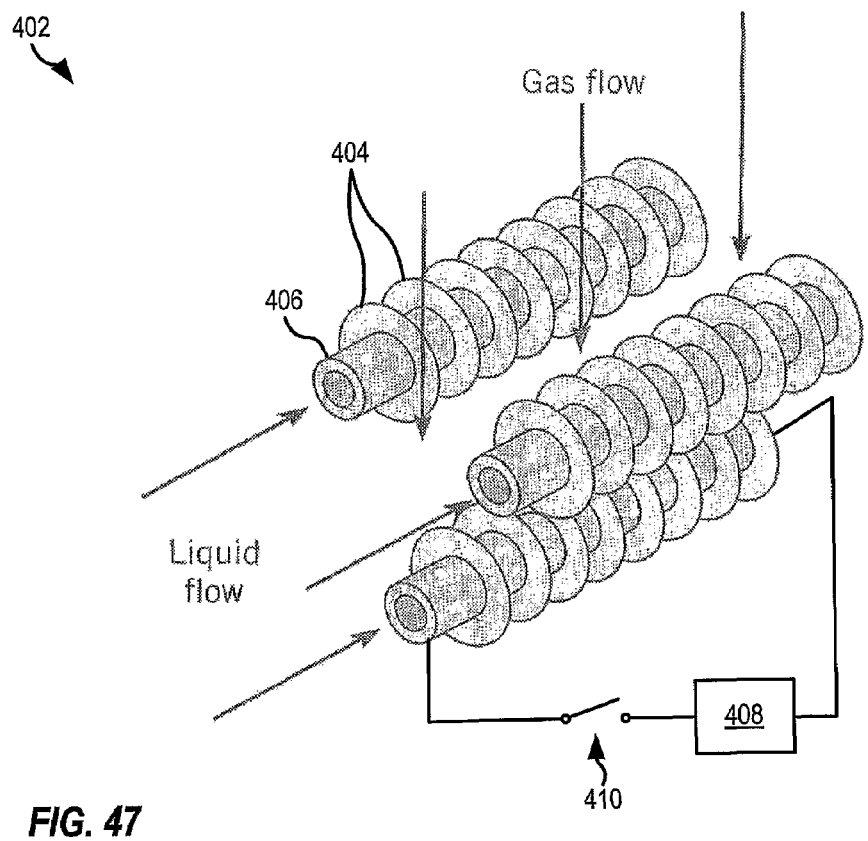
FIG. 47 shows one embodiment of a heat exchanger having an array of fins mounted upon tubes.
Figure 48:
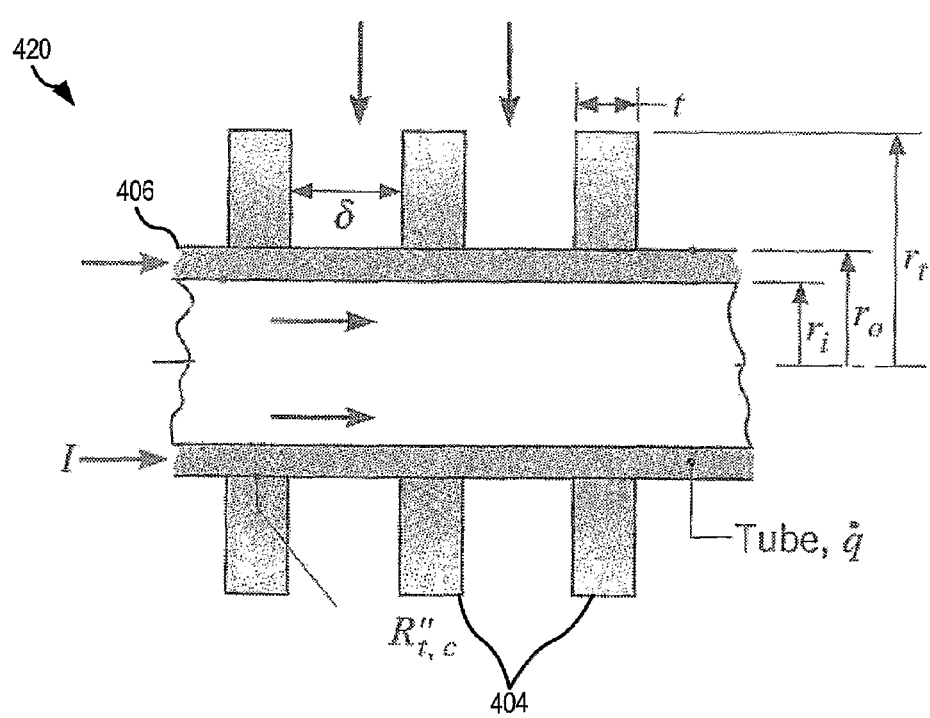
FIG. 48 shows a cross section through one tube and fin assembly.

FIG. 47 shows one embodiment of a heat exchanger 402 having an array of fins 404 mounted upon tubes 406. FIG. 48 shows a cross section through one tube and fin assembly. Each tube 406 is connected to a power source 408 through a switch 410 such that when the switch is closed, current flows through tube 406 to generate heat; thereby operating to de-ice heat exchanger 402. In FIG. 47, only one tube 406 is shown with electrical connections for clarity of illustration. When a short current pulse passes through tubes 406, Joule-heat is generated within the walls of tubes 406. Since there is a very low contact thermal resistance between tubes 406 and fins 404, and due to a high rate of heat diffusion in the metallic fins, the Joule-heating generated in tubes 406 quickly propagates into fins 404, melting ice or/and frost grown on heat exchanger 402.

The following example illustrates the rate of heat diffusion. The heat diffusion length in some material, $L_D$, is given by:

$$L_D(t) \approx 2 \cdot \sqrt{\alpha \cdot t} \qquad \text{Eq. 15}$$

where $$\alpha = \frac{k}{\rho \cdot C_P} \qquad \text{Eq. 16}$$

where t is time, $\alpha$ is a thermal diffusivity of the material, k is the material's thermal conductivity, $\rho$ is the material's density, and $C_P$ is the material's heat capacity.

Figure 49:
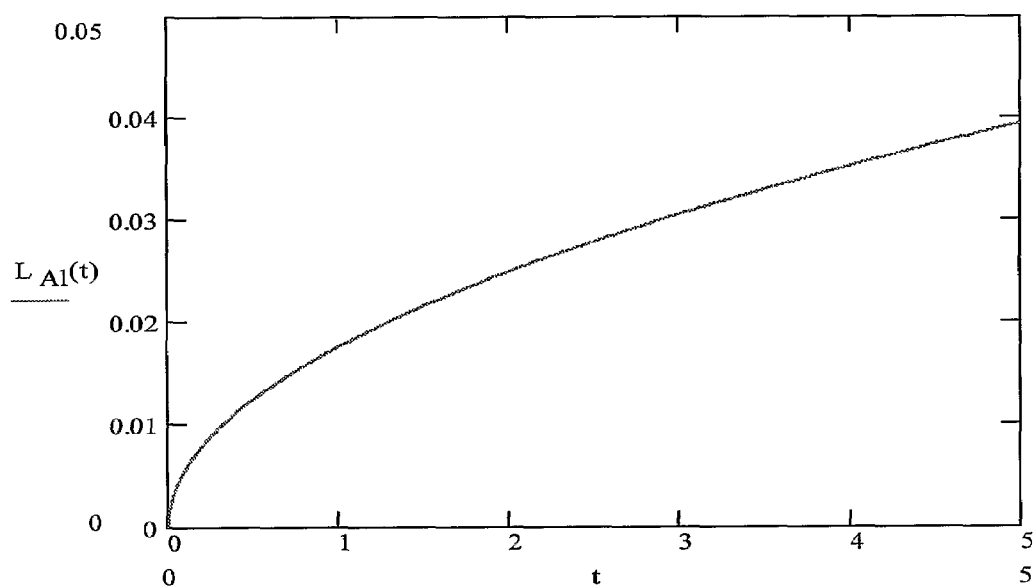
FIG. 49 shows a chart illustrating heat-diffusion length versus time for pure aluminum at room temperature.

FIG. 49 shows a chart illustrating heat-diffusion length (m) versus time (s) for pure aluminum at room temperature. In particular, FIG. 49 shows that in one second the heat diffuses in aluminum over 1.8 cm, and over 3.9 cm in five seconds. Thus, this diffusion length is sufficient to heat a fin 404 (where fin 404 is of a typical size) in about one second when the heat is generated inside tube 406.

This embodiment facilitates use within a wide range of heat exchangers currently employed in the refrigeration industry.

For example, shape of fins 404 may be one or more of: annular, square, pin-like, etc. Fins 404 and tubes 406 may be made of one or more of: aluminum, copper, stainless steel, conductive polymers, or other alloy. Stainless steel tubes, for example, may be used to facilitate resistive heating because stainless steel has high electrical resistance. Other metals and alloys may also be used.

Power supply 408 may be any low-voltage high-current DC or AC power supply that has sufficient power. For example, power supply 408 may be one or more of: a battery, a bank of super-capacitors, a step-down transformer, an electronic step-down transformer, etc. In one embodiment, power supply 408 produces a high-frequency current that is beneficial since the electrical resistance of tubes 406 may be increased due to the skin effect when carrying high frequency current.

To generate more uniform electric heating, fins 404 may be electrically isolated from tubes 406 while maintaining a good thermal contact with tubes 406. For example, a thin anodized layer on the aluminum surface, a thin layer of a polymer, or an epoxy adhesive may form such thin electrical insulation.

As illustrated in the above example, such pulse heating limits heat loss due to convective heat exchange with a liquid refrigerant in the base tube and to the air on the outer surface of the heat exchanger, thereby reducing average power requirement and enabling deicing and defrosting to be performed without shutting down heat exchanger 402 (i.e., without shutting down the freezer, cooler, or air-conditioner). By applying a heating pulse with sufficiently frequency, thin layers of ice or frost grown on the fins and outer-surface of the tube are melted, thus maintaining the heat-exchanger surfaces virtually ice and frost free. This may thus improve performance of the heat exchanger, reduce power requirements, and may increase shelf-life of food stored in a refrigerator.

Consider heat exchanger 402 of FIG. 47 made of aluminum and having very typical dimensions: tube of inner diameter of 1 cm, tube wall thickness of 0.30 mm, fins' diameter of 36 mm, fins' thickness of 0.5 mm, and with space between the fins of 4 mm.

Such a heat exchanger has a mass of about 330 g/m (per meter length of the tube) and a total surface area (fins+outer surface of tube) of 0.47 $m^2$/m (square meter per meter length of the tube). Assume that the temperature of the refrigerant in the tube is $-18°$ C., that the convective heat-exchange rate at the inner surface of tube 406 is 1000 W/($m^2 \cdot$K), that the air temperature is $+5°$ C. and that the convective heat-exchange coefficient between the air and the outer surface of heat exchanger 402 is 65 W/($m^2 \cdot$K).

Figure 50:
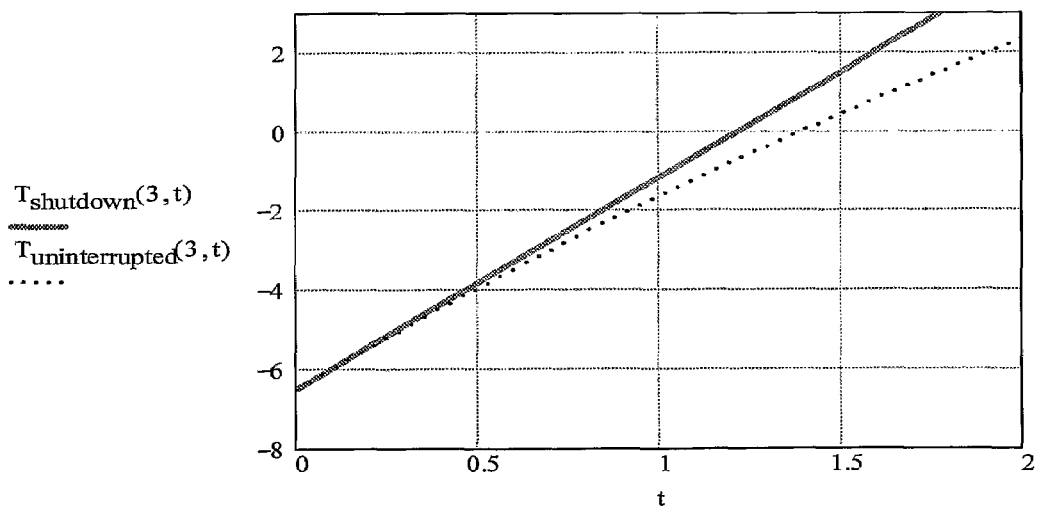
FIG. 50 shows a chart illustrating temperature versus time for an aluminum heat exchanger when (a) powered by a heating pulse during operation and (b) powered by a heating pulse with cooling pump and fans off.

As shown in FIG. 50, when 3 V/m electric field is applied to tube 406, it takes less then 1.4 second to heat the surface of aluminum above $0°$ C. Once the surface of the aluminum is above $0°$ C., a thin layer of frost, if formed on the surface of the aluminum, starts to melt.

| Item | Symbol | Value |
|---|---|---|
| Tube length | L | 1 m |
| Tube inner diameter | $r_i$ | 4.85 mm |
| Tube outer diameter | $r_o$ | 5 mm |
| Fin outer diameter | $r_t$ | 36 mm |
| Fin thickness | $t_f$ | 500 μm |
| Space between fins | δ | 4 mm |
| Inner surface area of tube | $A_i$ | 0.03 $m^2$ |
| Area in contact with air | $A_0$ | 0.47 $m^2$ |
| Aluminum volume | $V_{Al}$ | $1.22 \cdot 10^{-4} m^3$ |
| Thermal conductivity of Aluminum | $k_{Al}$ | 200 W/(m · K) |
| Density of Aluminum | $\rho_{Al}$ | 2700 kg/$m^3$ |
| Heat capacity of Aluminum | $C_{Al}$ | $0.95 \cdot 10^3$ J/(kg · K) |
| Thermal diffusivity of Aluminum | $D_{Al}$ | $k_{Al}/(\rho_{Al} \cdot C_{Al})$ |
| Lump-heat capacitance of the heat exchanger | $C_t$ | $\rho_{Al} \cdot C_{Al} \cdot V_{Al}$ |
| Boundary conditions | | |
| Convective heat-exchange coefficient on tube inner surface | $h_f$ | 1000 W/($m_2$ · K) |
| Average convective heat exchange coefficient on outer surface of heat exchanger | $h_{air}$ | 65 W/($m_2$ · K) |
| Refrigerant temperature | $T_f$ | $-18°$ C. |
| Air temperature | $T_{air}$ | $5°$ C. |
| Biot number in the problem | $B_i$ | $h_f \cdot (r_t - r_i)/k_{Al} = 0.066$ |
| Mean initial temperature of Aluminum | $T_{Al}$ | $-6.488°$ C. |
| Electrical parameters | | |
| Aluminum resistivity | $\rho_e$ | $2.5 \cdot 10^{-8}$ ohm · m |
| Tube electrical resistance | $R_e$ | $5.386 \cdot 10^{-3}$ ohm |
| Voltage range applied to tube | V | Variable |
| Resistive heat generation rate | W(V) | $V^2/R_e$ Watts |
| Time range | t | variable |
| Heat exchanger temperature during Pulse-heating when heat exchanger is shutdown | $T_{shutdown}$(V, t) | |
| Heat exchanger temperature during Pulse-heating when heat exchanger is operating | $T_{uninterrupted}$(V, t) | |

Heat exchanger temperature during pulse-heating when heat exchanger is shutdown is determined by:

$$T_{Shutdown}(V, t) = \frac{T_{Al} \cdot C_t + t \cdot (W(V))}{C_t},$$

and heat exchanger temperature during pulse-heating when heat exchanger is operating without interruption is determined by:

$$T_{uninterrupted}(V, t) = \frac{C_1(V)}{C_2} - \left(\frac{C_1(V)}{C_2} - T_{Al}\right) \cdot \exp\left(\frac{-C_2}{C_t} \cdot t\right)$$

where $$C_1(V) = W(V) + h_f \cdot A_i \cdot T_f + h_{air} \cdot A_0 \cdot T_{air}$$

and $$C_2 = h_f \cdot A_i + h_{air} \cdot A_0$$

FIG. 50 shows a chart illustrating temperature versus time for the aluminum heat exchanger when powered by a heating pulse during operation and when powered by a heating pulse with cooling pump and fans off. In particular, FIG. 50 shows that defrosting may be successfully performed without shutting down the coolant pump or fans since it takes less than 1.4 seconds to start frost melting during uninterrupted operation. In this example, 3V is applied to a 1 meter section of heat exchange tube (e.g., tube 406) generating 1.671 kW of heating power. The tube conducts 557.004 A with 3V applied.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An ice making system, comprising:
    a cold plate;
    a dielectric layer, the dielectric layer comprising varying thickness such that the ice is thinner where the dielectric layer is thicker;
    a thin metal foil cooled by the cold plate through the dielectric layer, such that water adjacent the metal foil forms ice thereon;
    a power supply; and
    a switch operable to couple current from the power supply to the thin metal foil, to generate a heating pulse that melts an interfacial layer of the ice at the thin metal foil and release the ice.

2. The system of claim 1, the power supply comprising AC power or DC power supply.

3. The system of claim 1, the power supply comprising a battery or a capacitor or an ultracapacitor.

4. The system of claim 1, the switch comprising a power-MOSFET, IGBT, thyristor, mechanical switch, an electromagnetic switch, or combination thereof.

5. The system of claim 1, wherein applied voltage and current of the heating pulse provides sufficient density of heating power in an approximate range of 1 kw/m$^2$ to 500 kw/m$^2$.

6. The system of claim 5, the voltage being 2.5V to 1000V, depending on electrical resistance of the metal foil.

7. The system of claim 1, the metal foil having a thickness of 0.5 μm to 1 mm.

8. The system of claim 1, the metal foil comprising conductive paint, conductive polymer layer, carbon-fiber composite material or carbon nanotube composite material.

9. The system of claim 1, the dielectric layer electrically isolating the metal foil from the cold plate and comprising one or more of ceramic, glass, rubber, polymer and composite materials.

10. The system of claim 9, the dielectric layer having thickness in a range of 10 μm to 2 mm.

11. The system of claim 1, the switch operating such that the heating pulse has a duration from 1 ms to 30 s.

12. The system of claim 1, wherein the metal foil forms one or more pockets for the ice.

13. The system of claim 12, wherein ice released from the foil after the heating pulse comprises ice cubes.

14. The system of claim 1, the varying thickness constructed and arranged such that the ice forms a shape.

15. The system of claim 14, the shape being one of a semi-sphere, semi-cylinder, rectangular bar, star.

16. The ice making system of claim 1, wherein said dielectric layer comprises air.

17. The ice making system of claim 16, further comprising layer thickness control apparatus for selectively varying a thickness of the dielectric layer during operation of the system.

18. The ice making system of claim 17, wherein said layer thickness control apparatus comprises:
    a pumping system operable to pump air into or out of a space between the cold plate and the metal foil, wherein pumping the air into the space separates the cold plate from the metal foil and wherein pumping air out removes air from the space and compresses the metal foil to the cold plate.

19. The system of claim 18, the metal foil forming one or more pockets for the ice.

20. The system of claim 18, the cold plate forming one or more grooves to shape ice grown onto the metal foil.

21. The system of claim 18, wherein applied voltage and current of the heating pulse provides sufficient density of heating power in an approximate range of one thousand to five hundred thousand watts per square meter.

22. The ice making system of claim 1, wherein said dielectric layer comprises at least one dielectric film.

23. An ice making system, comprising:
    a cold plate;
    a dielectric layer, the dielectric layer comprising varying thickness such that the ice is thinner where the dielectric layer is thicker;
    a thin metal foil cooled by the cold plate through the dielectric layer, such that water adjacent the metal foil forms ice thereon;
    a power supply; and
    a switch operable to couple current from the power supply to the thin metal foil, to generate a heating pulse that melts an interfacial layer of the ice at the thin metal foil and release the ice, and wherein the switch is a switching device selected from the group of devices consisting of a power-MOSFET, IGBT, thyristor, mechanical switch, an electromagnetic switch, and combinations thereof; and
    wherein applied voltage and current of the heating pulse provides density of heating power in an approximate range of one thousand to five hundred thousand watts per square meter of the metal foil.

24. The system of claim 23, the dielectric layer electrically isolating the metal foil from the cold plate and comprising one or more of ceramic, glass, rubber, polymer and composite materials.

25. The system of claim 23, the switch operating such that the heating pulse has a duration from one millisecond to thirty seconds.

26. The system of claim 23, wherein the metal foil forms one or more pockets for the ice.

27. The ice making system of claim 23, wherein said dielectric layer comprises at least one dielectric film having portions having a thick thickness corresponding to thin ice formation, and portions having a thin thickness corresponding to thick ice formation.

28. The ice making system of claim 27, further comprising layer thickness control apparatus for selectively varying a thickness of the dielectric layer during operation of the system from a relatively thin thickness during ice formation to a relatively thick thickness during ice release.

* * * * *